United States Patent
Guy et al.

(10) Patent No.: US 12,002,083 B2
(45) Date of Patent: Jun. 4, 2024

(54) VISUAL QUALITY PERFORMANCE PREDICTORS

(71) Applicant: eBay Inc., San Jose, CA (US)

(72) Inventors: Ido Guy, Haifa (IL); Slava Novgorodov, Rishon LeZion (IL); Arnon Dagan, Kfar Vitkin (IL)

(73) Assignee: eBay Inc., San Jose, CA (US)

( * ) Notice: Subject to any disclaimer, the term of this patent is extended or adjusted under 35 U.S.C. 154(b) by 96 days.

(21) Appl. No.: 17/448,083

(22) Filed: Sep. 20, 2021

(65) Prior Publication Data

US 2023/0011114 A1 Jan. 12, 2023

Related U.S. Application Data

(60) Provisional application No. 63/218,710, filed on Jul. 6, 2021.

(51) Int. Cl.
*G06Q 30/0601* (2023.01)
*G06F 11/34* (2006.01)
(Continued)

(52) U.S. Cl.
CPC ..... *G06Q 30/0633* (2013.01); *G06F 11/3409* (2013.01); *G06F 16/24578* (2019.01);
(Continued)

(58) Field of Classification Search
CPC ..... G06F 16/9532; G06F 18/214; G06N 3/04; G06Q 30/0643
See application file for complete search history.

(56) References Cited

U.S. PATENT DOCUMENTS 8,370,282 B1 * 2/2013 Leung .................. G06F 16/583
706/20
8,744,180 B2 6/2014 Atsmon et al.
(Continued)

OTHER PUBLICATIONS

Zhu et al., "R2GAN: Cross-Modal Recipe Retrieval With Generative Adversarial Network", Proceedings of the IEEE/CVF Conference on Computer Vision and Pattern Recognition (CVPR), 2019, pp. 11477-11486.
(Continued)

*Primary Examiner* — Kannan Shanmugasundaram
(74) *Attorney, Agent, or Firm* — Shook, Hardy & Bacon L.L.P.

(57) ABSTRACT

A visual search recommendation engine utilizes an image quality indication model for a visual search recommendation. Specifically, the visual search recommendation engine receives a search image as a search query at a search engine. The visual search recommendation engine provides the search image as an input into the image quality indication model, which is trained to output an image quality indication based on image aspects of the search image. A plurality of images are identified from an image corpus. The visual search recommendation engine determines an image similarity based on a comparison between the plurality of images from the image corpus and the search image. The image quality indication and the image similarity indicate a search query performance for the search image. A first image exceeding the search query performance is identified. The first image is provided for display at the search engine.

19 Claims, 7 Drawing Sheets

(51) Int. Cl.
| | |
|---|---|
| *G06F 16/2457* | (2019.01) |
| *G06F 16/532* | (2019.01) |
| *G06F 16/9532* | (2019.01) |
| *G06F 16/9535* | (2019.01) |
| *G06F 16/9538* | (2019.01) |
| *G06F 18/214* | (2023.01) |
| *G06N 3/04* | (2023.01) |
| *G06N 3/088* | (2023.01) |

(52) U.S. Cl.
CPC ........ *G06F 16/532* (2019.01); *G06F 16/9532* (2019.01); *G06F 16/9535* (2019.01); *G06F 16/9538* (2019.01); *G06F 18/214* (2023.01); *G06N 3/04* (2013.01); *G06N 3/088* (2013.01); *G06Q 30/0631* (2013.01); *G06Q 30/0643* (2013.01)

(56) References Cited

U.S. PATENT DOCUMENTS

| | | | |
|---|---|---|---|
| 10,043,109 | B1 | 8/2018 | Du et al. |
| 10,353,948 | B2 | 7/2019 | Perez |
| 10,628,708 | B2 | 4/2020 | Lin et al. |
| 10,776,417 | B1 | 9/2020 | Ravichandran et al. |
| 10,824,942 | B1 | 11/2020 | Bhotika et al. |
| 10,846,327 | B2 | 11/2020 | Salokhe et al. |
| 10,916,003 | B2 | 2/2021 | Doutre et al. |
| 11,580,585 | B1 | 2/2023 | Rajana et al. |
| 11,775,617 | B1 | 10/2023 | Jaiswal et al. |
| 2009/0067726 | A1 | 3/2009 | Erol et al. |
| 2011/0085739 | A1* | 4/2011 | Zhang ............... G06F 16/58 382/218 |
| 2011/0212717 | A1* | 9/2011 | Rhoads ............ G06F 16/9537 455/418 |
| 2012/0128239 | A1* | 5/2012 | Goswami .......... G06F 16/24578 382/173 |
| 2012/0323738 | A1 | 12/2012 | Gokturk et al. |
| 2015/0039462 | A1* | 2/2015 | Shastry ............. G06Q 30/0631 705/26.81 |
| 2016/0034559 | A1 | 2/2016 | Feyereisl et al. |
| 2018/0181569 | A1 | 6/2018 | Jarr et al. |
| 2018/0307667 | A1* | 10/2018 | Ye ...................... G06F 40/232 |
| 2019/0244271 | A1 | 8/2019 | Piramuthu et al. |
| 2020/0218754 | A1 | 7/2020 | Cady et al. |
| 2021/0117691 | A1 | 4/2021 | Shen et al. |
| 2022/0222297 | A1 | 7/2022 | Chow et al. |

OTHER PUBLICATIONS

Lowe, D, "Distinctive Image Features from Scale-Invariant Keypoints", International Journal of Computer Vision,60(2), Jan. 7, 2004, pp. 91-110.

McAuley et al., "Image-Based Recommendations on Styles and Substitutes", Retrieved from the Internet URL : <https://dl.acm.org/doi/pdf/10.1145/2766462.2767755>, SIGIR '15: Proceedings of the 38th International ACM SIGIR Conference on Research and Development in Information, Aug. 9, 2015, pp. 43-52.

Mikolov et al., "Distributed Representations of Words and Phrases and Their Compositionality", Retrieved from the Internet URL:<https://arxiv.org/pdf/1310.4546.pdf>, Oct. 16, 2013, pp. 3111-3119.

Misraa et al., "Multi-Modal Retrieval using Graph Neural Networks", Retrieved from the Internet URL :<https://arxiv.org/pdf/2010.01666.pdf>, Oct. 4, 2020, 8 pages.

Parikh, "A Tourist Place Recommendation and Recognition System", Proceedings of the 2nd International Conference on Inventive Communication and Computational Technologies (ICICCT 2018), Apr. 20-21, 2018, pp. 218-222.

Ponte et al., "A language modeling approach to information retrieval", SIGIR '98: Proceedings of the 21st annual International ACM, Aug. 1998, pp. 275-281.

Robertson et al., "Okapi at TREC-3", In Proceedings of TREC-3, 1994, 18 Pages.

Roitman et al., "Enhanced Mean Retrieval Score Estimation for Query Performance Prediction", ICTIR '17: Proceedings of the ACM SIGIR International Conference on Theory of Information Retrieval, Oct. 1-4, 2017, pp. 35-42.

Saez-Trumper, Diego, "Fake tweet buster: a webtool to identify users promoting fake news ontwitter", HT '14: Proceedings of the 25th ACM conference on Hypertext and social media, Sep. 1-4, 2014, pp. 316-317.

Shapovalov et al., "The Potential of Using Google Expeditions and Google Lens Tools under STEM-education in Ukraine", arXiv:1808.06465, 2018, 9 pages.

Shiau et al., "Shop The Look: Building a Large Scale Visual Shopping System at Pinterest", In 26th ACM SIGKDD Conference on Knowledge Discovery and Data Mining (KDD '20), Aug. 23-27, 2020, pp. 3203-3212.

Shtok et al., "Predicting Query Performance by Query-Drift Estimation", ACM Transactions on Information Systems, vol. 30, Issue 2, Article No. 11, May 2012, pp. 1-35.

Singh et al., "Rewriting Null E-Commerce Queries to Recommend Products", Proceedings of the 21st International Conference on World Wide Web, Apr. 16-20, 2012, pp. 73-82.

Sondhi et al., "A Taxonomy of Queries for E-commerce Search", SIGIR '18: The 41st International ACM, Jul. 8-12, 2018, pp. 1245-1248.

Su et al., "User Intent, Behaviour, and Perceived Satisfaction in Product Search", WSDM '18: Proceedings of the Eleventh ACM, Feb. 5-9, 2018, pp. 547-555.

Talebi et al., "NIMA: Neural Image Assessment", IEEE Transactions on Image Processing, vol. 27, No. 8, Aug. 2018, pp. 3998-4011.

Tao et al., "Query Performance Prediction By Considering Score Magnitude and Variance Together", CIKM '14: Proceedings of the 23rd ACM, Nov. 3-7, 2014, pp. 1891-1894.

Tian et al., "Daxing Smartphone Identification Dataset", IEEE Access, vol. 7, 2019, pp. 101046-101053.

Togashi et al., "Visual Intents vs. Clicks, Likes, and Purchases in E-commerce", SIGIR '20: Proceedings of the 43rd International ACM, Jul. 25-30, 2020, pp. 1869-1872.

Tsagkias et al., "Challenges and research opportunities in eCommerce search and recommendations", ACM SIGIR Forum, vol. 54, Issue 1, Article No. 2, Jun. 2020, pp. 1-23.

Tunkelang, Daniel, "Faceted search", Synthesis Lectures on Information Concepts, Retrieval, and Services, vol. 1, No. 1, 2009, pp. 1-80.

Tzaban et al., "Product Bundle Identification using Semi-Supervised Learning", SIGIR '20: Proceedings of the 43rd International ACM, Jul. 25-30, 2020, pp. 791-800.

Zhao et al., "Effective Pre-retrieval Query Performance Prediction Using Similarity and Variability Evidence", ECIR'08: Proceedings of the IR research, 30th European conference on Advances in information retrieval, 2008, pp. 52-64.

Wan et al., "Deep Learning for Content-Based Image Retrieval: A Comprehensive Study", MM '14: Proceedings of the 22nd ACM, Nov. 3-7, 2014, pp. 157-166.

Wroblewska et al., "Visual Recommendation Use Case for an Online Marketplace Platform: allegro.pl", SIGIR '16: Proceedings of the 39th International ACM, Jul. 17-21, 2016, pp. 591-594.

Yang et al., "Visual Search at eBay", 23rd SIGKDD Conference on Knowledge Discovery and Data Mining, Aug. 13-17, 2017, pp. 2101-2110.

Young et al., "From image descriptions to visual denotations: New similarity metrics for semantic inference over event descriptions", Transactions of the Association for Computational Linguistics, vol. 2, 2014, pp. 67-78.

Zhai et al., "Learning a Unified Embedding for Visual Search at Pinterest", In Proceedings of the 25th ACM SIGKDD, Aug. 4-8, 2019, pp. 2412-2420.

Zhai et al., "Visual Discovery at Pinterest", International World Wide Web Conference Committee (IW3C2), WWW'17 Companion, Apr. 3-7, 2017, pp. 515-524.

(56) References Cited

OTHER PUBLICATIONS

Zhang et al., "Virtual ID Discovery from E-commerce Media at Alibaba: Exploiting Richness of User Click Behavior for Visual Search Relevance", CIKM '19: Proceedings of the 28th ACM International Conference on Information and Knowledge Management, Nov. 3-7, 2019, pp. 2489-2497.
Zhang et al., "Visual Search at Alibaba", KDD '18: Proceedings of the 24th ACM SIGKDD International Conference on Knowledge Discovery & Data Mining, Aug. 19-23, 2018, pp. 993-1001.
Kaggle,"Fashion Product Images Dataset", Retrieved from Internet URL: https://www.kaggle.com/paramaggarwal/fashion-product-images-dataset/, May 13, 2021, 5 Pages.
Visenze, "How Visual Search has transformed the modern shopping experience", Retrieved from Internet URL: https://www.visenze.com/blog/2019/03/21/how-visual-search-has-transformed-the-modern-shopping-experience/, May 13, 2021, 12 Pages.
Umer et al., "Machine learning method for cosmetic product recognition: a visual searching approach", Multimedia Tools and Applications, Retrieved from Internet URL: https://doi.org/10.1007/s11042-020-09079-y, 2020, pp. 34997-35023.
Google Shopping How To Increase Conversions, Retrieved from Internet URL: https://feedarmy.com/kb/google-shopping-how-to-increase-conversions/, Jun. 28, 2016, 13 Pages.
Eckstein et al., "Visual Browsing in Product Development Processes", Proceedings of ICED 09, the 17th International Conference on Engineering Design, vol. 8, Aug. 24-27, 2009, pp. 183-194.
Arora et al., "A Simple But Tough-to-beat Baseline For Sentence Embeddings", In Proc. of ICLR, Princeton University, 2017, 16 Pages.
Bell et al., "GrokNet: Unified Computer Vision Model Trunk and Embeddings For Commerce", Conference on Knowledge Discovery and Data Mining (KDD'20), Aug. 22-27, 2020, 9 Pages.
Berger et al., "Information Retrieval as Statistical Translation", ACM SIGIR Forum vol. 51 No. 2, Jul. 2017, pp. 219-226.
Bezryadin et al., "Brightness Calculation in Digital Image Processing", International symposium on technologies for digital photo fulfillment, DOI: https://doi.org/10.2352/ISSN.2169-4672.2007.1.0.10, 2007, pp. 10-15.
Bhardwaj et al., "Palette power: enabling visual search through colors", KDD '13 Proceedings of the 19th ACM SIGKDD international conference on Knowledge discovery and data mining,, 2013, pp. 1321-1329.
Bhattacharya et al., "Multimodal Dialog for Browsing Large Visual Catalogs using Exploration-Exploitation Paradigm in a Joint Embedding Space", Proceedings of the 2019 on International Conference on Multimedia Retrieval'19, Jun. 10-13, 2019, pp. 187-191.
Bitirim et al., "An Evaluation of reverse Image search performance of Google", IEEE 44th Annual Computers, Software, and Applications Conference (COMPSAC), 2020, pp. 1368-1372.
Blei et al., "Latent Dirichlet Allocation", Journal of Machine Learning Research (3), 2003, pp. 993-1022.
Broder, "A taxonomy of web search", ACM Sigir forum, vol. 36, No. 2, 2002, pp. 3-10.
Burney et al., "K-means cluster analysis for image segmentation", International Journal of Computer Applications (0975-8887), vol. 96—No. 4, Jun. 2014, 8 Pages.
Businesswire, "Visual Search Wins Over Text as Consumers' Most Trusted Information Source", Retrieved from Internet URL: https://www.businesswire.com/news/home/20190204005613/en/Visual-Search-Wins-Text-Consumers%E2%80%99-Trusted-Information, Feb. 4, 2019, 2 Pages.
Carmel et al., "Estimating the query difficulty for information retrieval", Morgan & Claypool Publishers, 2010, 89 Pages.
Carmel et al., "Folksonomy-Based Term Extraction for Word Cloud Generation", ACM Transactions on Intelligent Systems and Technology, vol. 3, No. 4, Article 60, Sep. 2012, 20 Pages.
Carmel et al., "Why do people buy seemingly irrelevant items in voice product search? On the relation between product relevance and customer satisfaction in ecommerce.", Proceedings of the 13th International Conference on Web Search and Data Mining (WSDM), Feb. 3-7, 2020, pp. 79-87.
Chaudhuri et al., "A smart system for selection of optimal product images in e-commerce", IEEE International Conference on Big Data (Big Data), 2018, pp. 1728-1736.
Cronen-Townsend et al., "Predicting Query Performance", In proceedings of SIGIR'2002, Aug. 11-15, 2002, pp. 299-306.
Cummins et al., "Improved query performance prediction using standard deviation", In proceedings of SIGIR'11, Jul. 24-28, 2011, pp. 1089-1090.
Dagan et al., "An Image is Worth a Thousand Terms? Analysis of Visual E-Commerce Search", Proceedings of the 44th International ACM SIGIR Conference on Research and Development in Information Retrieval, Jul. 11-15, 2021, 11 Pages.
Datta et al., "Content-Based Image Retrieval—Approaches and Trends of the New Age", MIR '05: Proceedings of the 7th ACM SIGMM international workshop on Multimedia information retrieval, Nov. 11-12, 2005, pp. 253-262.
Datta et al., "Image Retrieval: Ideas, Influences, and Trends of the New Age", ACM Computing Surveys, vol. 40, No. 2, Article 5, Apr. 2008, 60 Pages.
Elkasrawi et al., "What you see is what you get? Automatic Image Verification for Online News Content", 12th IAPR Workshop on Document Analysis Systems, 2016, pp. 114-119.
Fiorelli,"How to optimize your Ecommerce for Google Images and Visual Search", Retrieved from Internet URL: https://www.iloveseo.net/how-to-optimize-your-ecommerce-for-google-images-and-visual-search/, Apr. 8, 2020, pp. 1-62.
Fleiss et al., "Measuring nominal scale agreement among many raters", Psychological bulletin vol. 76, No. 5, 1971, pp. 378-382.
Gandomkar et al., "Visual search in breast imaging", The British journal of radiology, 92(1102), 20190057, 2019, 15 Pages.
Goodrum et al., "Image searching on the Excite Web search engine", Information Processing and Management 37, 2, 2001, pp. 295-311.
Guy,"Searching by Talking: Analysis of Voice Queries on Mobile Web Search", Proceedings of SIGIR'16, Jul. 17-21, 2016, pp. 35-44.
Guy, "The Characteristics of Voice Search: Comparing Spoken with Typed-in Mobile Web Search Queries", ACM Transactions on Information Systems, vol. 36, No. 3, Article 30, Mar. 2018., 28 Pages.
Hadwiger et al., "The Forchheim Image Database for Camera Identification in the Wild", Retrieved from the Internet URL :<https://arxiv.org/pdf/2011.02241.pdf>, Nov. 4, 2020, 8 pages.
Hauff et al., "A Survey of Pre-Retrieval Query Performance Predictors", CIKM '08: Proceedings of the 17th ACM conference on Information and knowledge management, Retrieved from the Internet URL :<https://dl.acm.org/doi/pdf/10.1145/1458082.1458311>, Oct. 26-30, 2008, pp. 1419-1420.
Hauff et al., "The Combination and Evaluation of Query Performance Prediction Methods", European Conference on Information Retrieval. Springer, Berlin, Heidelberg, Retrieved from the Internet URL :<https://chauff.github.io/documents/publications/ECIR2009-hauff.pdf>, 2009, pp. 301-312.
He et al., "Deep Residual Learning for Image Recognition", 2016 IEEE Conference on Computer Vision and Pattern Recognition, DOI: 10.1109/CVPR.2016.90., Jun. 2016, pp. 770-778.
Hegde et al., "Similar Image Search for Histopathology: SMILY", Retrieved from the Internet URL :<https://www.nature.com/articles/s41746-019-0131-z.pdf> Scripps Research Translational Institute, NPJ Digital Medicine (2019), Jun. 21, 2019, pp. 1-9.
Hirsch et al., "Query Reformulation in E-Commerce Search", Retrieved from the Internet URL :<https://dl.acm.org/doi/pdf/10.1145/3397271.3401065> SIGIR '20: Proceedings of the 43rd International ACM SIGIR Conference on Research and Development in Information, Jul. 25-30, 2020, pp. 1319-1328.
Hsiao et al., "On Visual Similarity Based Interactive Product Recommendation For Online Shopping", Retrieved from the Internet URL :<https://projet.liris.cnrs.fr/imagine/pub/proceedings/ICIP-2014/Papers/1569911169.pdf> , © 2014 IEEE, 2014, pp. 3038-3041.

(56) References Cited

OTHER PUBLICATIONS

Hu et al., "Web-Scale Responsive Visual Search at Bing", Retrieved from the Internet URL :<https://dl.acm.org/doi/pdf/10.1145/3219819.3219843>, KDD 2018: Proceedings of the 24th ACM SIGKDD International Conference on Knowledge Discovery & Data Mining, Aug. 19-23, 2018, pp. 359-367.

Jiang et al., "Understanding the Role of Style in E-commerce Shopping", Retrieved from the Internet URL :<https://dl.acm.org/doi/pdf/10.1145/3292500.3330760>, KDD '19, © 2019 Association for Computing Machinery, Aug. 4-8, 2019, pp. 3112-3120.

Jing et al., "Visual Search at Pinterest", In Proceedings of the 21th ACM SIGKDD International Conference on Knowledge Discovery and Data Mining, 2015, pp. 1889-1898.

Jones et al., "Beyond the Session Timeout: Automatic Hierarchical Segmentation of Search Topics in Query Logs", Retrieved from the Internet URL :<https://dl.acm.org/doi/pdf/10.1145/1458082.1458176>, CIKM '08: Proceedings of the 17th ACM conference on Information and knowledge management, Oct. 26-30, 2008, pp. 699-708.

Zhou et al., "Query performance prediction in web search environments", SIGIR '07: Proceedings of the 30th annual International ACM, Jul. 23-27, 2007, pp. 543-550.

Kang et al., "Complete the Look: Scene-based Complementary Product Recommendation", Retrieved from Internet: <https://openaccess.thecvf.com/content_CVPR_2019/papers/Kang_Complete_the_Look_Scene-Based_Complementary_Product_Recommendation_CVPR_2019_paper.pdf>, Proceedings of the IEEE/CVF Conference on Computer Vision and Pattern Recognition, 2019, pp. 10532-10541.

Kim et al., "Visual Fashion-Product Search at SK Planet", Retrieved from the Internet URL : <https://arxiv.org/pdf/1609.07859v1.pdf>, Sep. 26, 2016, 13 pages.

Kurland et al., "A Unified Framework for Post-Retrieval Query-Performance Prediction", Retrieved from the Internet URL :<https://ie.technion.ac.il/~kurland/qppFramework.pdf>, © Springer-Verlag Berlin Heidelberg 2011, 2011, pp. 15-26.

Laenen et al., "Web Search of Fashion Items with Multimodal Querying", Retrieved from the Internet URL :<https://dl.acm.org/doi/pdf/10.1145/3159652.3159716>, WSDM '18: Proceedings of the Eleventh ACM International Conference on Web Search and Data Mining, Feb. 5-9, 2018, pp. 342-350.

Li et al., "Bootstrapping Complete The Look at Pinterest", Aug. 23, 2020, pp. 3299-3307.

Li et al., "Neural Networks for Fashion Image Classification and Visual Search", Retrieved from the Internet URL : <https://arxiv.org/pdf/2005.08170v1.pdf> BT5153 Applied Machine Learning Term Paper, MSBA @ NUS, 2020., May 17, 2020, 9 pages.

Li et al., "Predicting the effectiveness of queries for visual search", In 2012 IEEE International Conference on Acoustics, Speech and Signal Processing (ICASSP), Mar. 25, 2012, pp. 2361-2364.

Li et al., "The Design and Implementation of a Real Time Visual Search System on JD E-commerce Platform", Retrieved from the Internet URL :<https://dl.acm.org/doi/pdf/10.1145/3284028.3284030>, Middleware '18: Proceedings of the 19th International Middleware Conference Industry, Dec. 10, 2018, pp. 9-16.

Liao et al., "Interpretable Multimodal Retrieval for Fashion Products", Retrieved from the Internet URL :<https://dl.acm.org/doi/pdf/10.1145/3240508.3240646>,MM '18: Proceedings of the 26th ACM international conference on Multimedia, Oct. 15, 2018, pp. 1571-1579.

Lien et al., "Recipe Retrieval with Visual Query of Ingredients", Retrieved from the Internet URL :<https://dl.acm.org/doi/pdf/10.1145/3397271.3401244> SIGIR '20: Proceedings of the 43rd International ACM SIGIR Conference on Research and Development in Information Retrieval, Jul. 25, 2020, pp. 1565-1568.

Lin et al., "Adversarial Learning For Fine-grained Image Search", 2019 IEEE International Conference on Multimedia and Expo (ICME), 2019, pp. 490-495.

Non-Final Office Action received for U.S. Appl. No. 17/399,546, mailed on Mar. 26, 2024, 56 pages.

\* cited by examiner

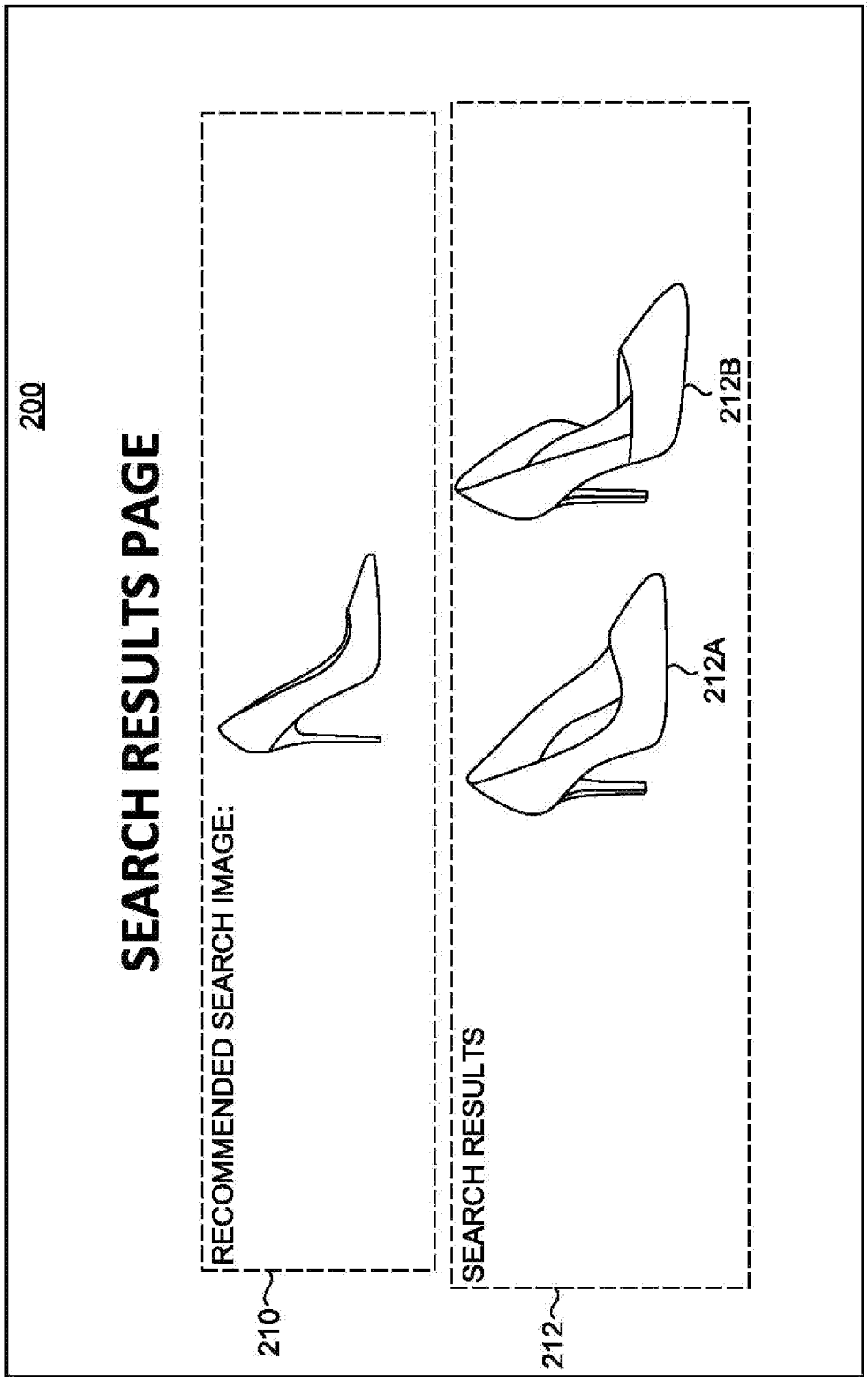

VISUAL QUALITY PERFORMANCE PREDICTORS

CROSS-REFERENCE TO RELATED APPLICATIONS

This application claims the benefit of priority to U.S. Provisional Application No. 63/218,710, filed on Jul. 6, 2021, and entitled, "Search Image Recommendations Using Visual Quality Performance Predictor," the entirety of which is expressly incorporated by reference.

BACKGROUND

A Query Performance Prediction (QPP) quantifies the quality of search results retrieved from a corpus. A query (e.g., a search string, as in web search engines or the like), for example, may not uniquely identify a single object in a searched collection; but rather, there may be several objects matched therewith that have varying degrees of relevance. The QPP is an information retrieval task for accessing a retrieval quality of a query. Conventional QPP models estimate an effectiveness of an evaluation of the query over the corpus without considering the varying degrees of relevance. Accordingly, the QPP attempts to predict values that correlate as closely as possible with an actual query performance.

Two types of QPPs include (1) pre-retrieval QPPs, which estimate a query's quality based on the query itself and corpus statistics and (2) post-retrieval QPPs, which assess the query performance by considering the retrieved result list. Many pre-retrieval QPP methods use only the properties of the query and the corpus for predicting the query's quality. Post-retrieval QPP methods predict the effectiveness of a search result list retrieved from a corpus by using a retrieval method in response to a search query. Query performance prediction has been studied for traditional textual search but has not been extensively studied for visual search.

SUMMARY

At a high level, aspects described herein relate to a visual search recommendation for providing an image as a recommendation for a search query. In general, visual search recommendations are based on an assessment of a retrieval quality of the search query. A user can use the image as the recommendation to retrieve a higher quality of search results for the search query.

A search image is received as the search query at a search engine. The search image is provided as an input into an image quality indication model. The image quality indication model is trained to output an image quality indication based on image aspects of the search image. For example, image aspects may include factors such as angle of view, blurriness, background quality, frame, watermarks, inclusion of human body parts, and additional elements depicted in the image that are not the intended focus of the image. The image quality indication model may include a convolutional neural network.

In aspects, a plurality of images are identified from an image corpus. An image similarity is determined based on a comparison between the plurality of images from the image corpus and the search image. The image similarity may be determined by an image similarity determination model by analyzing the plurality of images based on image latent vectors. The image quality indication and the image similarity indicate a search query performance for the search image. An image of the plurality of images that is exceeding the search query performance is identified. The image identified is provided for display as a recommendation for the search query.

The Summary is intended to introduce a selection of concepts in a simplified form that is further described in the Detailed Description of this disclosure. The Summary is not intended to identify key or essential features of the claimed subject matter, nor is it intended to be used as an aid in determining the scope of the claimed subject matter. Additional objects, advantages, and novel features of the technology will be provided, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIGS. 2A-2B are example graphical user interfaces generated by the visual search recommendation engine of FIG. 1 to provide to provide an image recommendation, in accordance with an aspect described herein;

DETAILED DESCRIPTION

Figure 1:
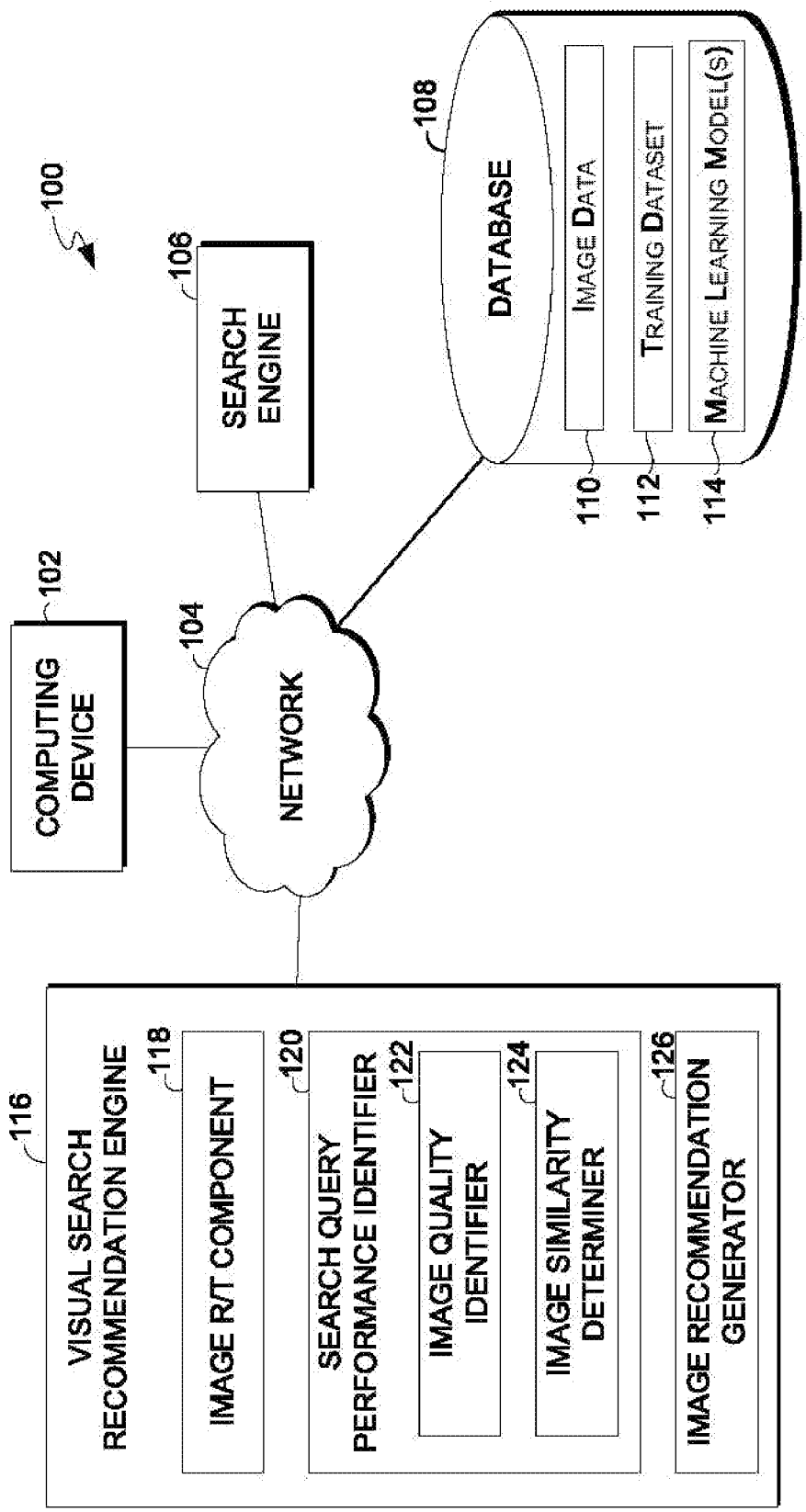
FIG. 1 is an example operating environment in which visual search recommendation engine can be employed, in accordance with an aspect described herein.

Conventional search engines fail to provide image recommendations for search queries based on a determined search query performance that is indicated by both an image quality indication and an image similarity. In general, image recommendations are useful in information retrieval when a user is using a search engine for inferring a query performance of a search query. Poorly performing queries reduce effectiveness of information retrieval systems. Using a reliable Query Performance Predictor (QPP) helps to determine effective retrieval strategies for each search query. For example, a QPP enhances selective decision methodologies to avoid failures of query expansions. QPP measures are even more important when predicting the performance of an image-based search when compared to a textual-based search, since many traditional query expansion methods that can be used with text cannot be used with images.

To predict a query performance, highly performing queries are identified. However, conventional methods do not provide the most accurate or highly performing performance predictors. For example, conventional methods usually provide for only textual performance predictors, which can restrict a user to a textual-based search. Further, conventional methods that include image recommendations are not the most accurate depictions for highly performing queries, making a subsequent query for a user more challenging because search engines are not precisely and accurately providing the most proper and accurate searches based on the conventional recommendations.

One problem with using these conventional images for search engines includes, but is not limited to, lower performing queries based on the conventional image recommendations failing to determine performance predictors that are indicated by both an image quality indication and an image similarity. For example, the use of these conventional recommendations results in generated search results that are less accurate and broader due to additionally encompassing result images that fail to capture a user's intent. For textual-based searching, a user's intent may be determined in response to additional refinement options upon receiving an initial set of search results. A user's intent may also be determined, for example, using a language of the user, prior search histories of the user, prior interaction data of the user, prior purchase histories of the user, a location of the user, etc.

One issue with conventional recommendations producing search results that are too broad includes display screens that are only able to provide a limited number of those broad search results at a user interface. Thus, conventional methods are presenting broad and inaccurate search results based on low performing queries that the conventional recommendations provided, at least because the conventional recommendations fail to recommend performance predictors that are indicated by both an image quality indication and an image similarity. As such, a user's intent can be easily misconstrued by the conventional methods.

A more accurate and relevant recommended performance predictor is desirable for improving search result pages, which is critical to the operation of the Internet and the operation of devices utilizing visual search engines. Without the more accurate and relevant recommendations, the probability of a user attempting to search at a search engine (e.g., for a particular item) could be nearly impossible, since the results that are presented are in the millions and are not accurate or precise with respect to the user's intent. For instance, at the time of drafting this application, a search query for "llama" at a popular search engine yielded more than 443,000,000 search results. Without identify the most relevant results and providing them to a user at a search results page, a user would not be able to effectively use the Internet to find the most relevant material, as it is inconceivable that the user could identify the most relevant results from this number. Thus, a more accurate method for search result retrieval and ranking is necessary for the operations of the Internet, and improvements in this field thus improve the functioning of the internet.

Accordingly, the present technology disclosed herein provides mechanisms to help overcome the challenges in the conventional methods. For example, some aspects of the present technology identify an image that exceeds a search query performance that is indicated by an image quality indication and an image similarity of a search image received as a search query at a search engine. An image quality indication model is trained to output the image quality indication based on image aspects of the search image. Further, the image similarity is determined based on a comparison between a plurality of images from an image corpus and the search image. In aspects, a post-retrieval image similarity may be determined based on a comparison between a subset of images selected from a first set of search results that were selected based on image similarity rankings of the search results, the rankings determined using image embeddings of the search results, the embeddings associated with an image aspect of the search image.

In all, by providing a recommended image that exceeds the search query performance indicated by the image quality indication and the image similarity of the search image, the search system receives fewer inputs from the user, as would be traditionally required to achieve a similar result. That is, a recommendation for a search query that more accurately identifies or ranks search results, when compared to a search image from the user, allows more efficient use of the Internet, since more relevant results are presented at a search page, and additionally because the user provides fewer inputs to the search engine when attempting to narrow down search results based on a search that less accurately identifies the search results. From the perspective of the search engine, the search engine is processing fewer commands due to the fewer user inputs. This enhances the efficiency of the computing system employing the search engine because the computing system is now able to process a larger number of search requests from users with the same computational processing ability as before. When employed, the reduced inputs and functions processed in response frees up bandwidth across the network on which the computing system is employed, thus allowing the network to facilitate the processing of more transactions by the system.

Further, by providing the recommended image that exceeds the search query performance indicated by the image quality indication and the image similarity of the search image, the probability of a user attempting to search at a search engine (e.g., for a particular item) is no longer nearly impossible, as is with the conventional methods. Stated differently, since the results that are provided based on the recommended image are more accurate and precise with respect to the user's intent. As such, the results identified are the most relevant results, allowing a user to effectively use the Internet to find the most relevant material.

For example, the present technology disclosed herein provides a recommended image that may be used as a search image for a particular search based on the user's intent. For example, the user's intent may be to search for a particular brand and style of skis. The recommended image for the search is determined based on an image quality indication, such as whether the image has a particular resolution and proper depiction of the skis, and an image similarity, such as how similar an image in a corpus of images is to the intended skis. For example, the image similarity is determined based on comparing a set of ski images of the particular brand and style from the image corpus and the search image. The recommended image for the search is thus determined based on a search query performance that is based on both the image quality indication and the image similarity. In aspects, a post-retrieval search query performance is determined in response to conducting the search query with the recommended image.

It will be realized that the method previously described is only an example that can be practiced from the description that follows, and it has been provided to more easily understand the technology and recognize its benefits. Additional examples are now described with reference to the figures.

With reference first to FIG. 1, among other components or engines not shown, example operating environment 100 includes computing device 102. Computing device 102 is shown communicating to search engine 106, database 108, and visual search recommendation engine 114 using network 104.

Beginning with computing device 102, the computing device 102 may be a device that corresponds to the computing device 600 described with reference to FIG. 6. In implementations, computing device 102 may be a client-side or front-end device, while in other implementations computing device 102 represents a back-end or server-side device. As will be discussed, computing device 102 may also represent one or more computing devices, and as such, some variations of the technology comprise both a client-side or front-end device, and a back-end or server-side computing device performing one or more functions that will be further described.

Turning to network 104, network 104 may include one or more networks or one or more portions of networks (e.g., a public network such as the internet or a virtual private network "VPN"). Network 104 may include, without limitation, one or more local area networks (LANs) wide area networks (WANs), or any other communication network or method that enables communication unilaterally, between, or among machines, databases, computing devices, and so forth.

Turning now to search engine 106, the search engine 106 may receive one or more search queries from a user or other service. For instance, the search query may be received from computing device 102. The search queries may be textual queries or visual queries, for example. In some embodiments, the query is an audio query. In some embodiments, the search engine 106 generates search results for computing device 102. For instance, a search query may be received at search engine 106 from computing device 102, processed to identify search results associated with the search query, and the search results may be provided to computing device 102 from search engine 106. In some embodiments, the search engine 106 performs the search query on a search image or an image identifier to identify item listings and item listing images corresponding to the item listings. In some embodiments, the search engine 106 may receive the search query from the image receiving/transmitting (R/T) component 118, as will be discussed in more detail. Search engine 106 may also provide a search results page via the image R/T component 118, the search results page comprising search result images corresponding to a recommended image that was selected.

Having identified various components of operating environment 100, it is noted again, and emphasized, that any additional or fewer components, in any arrangement, may be employed to achieve the desired functionality within the scope of the present disclosure. Although some components of FIG. 1 are depicted as single components, the depictions are intended as examples in nature and in number, and are not to be construed as limiting for all implementations of the present disclosure. The functionality of operating environment 100 can be further described based on the functionality and features of its components. Other arrangements and elements (e.g., machines, interfaces, functions, orders, groupings of functions, etc.) can be used in addition to or instead of those shown, and some elements may be omitted altogether.

Further, many of the elements described in relation to FIG. 1, such as those described in relation to visual search recommendation engine 114, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 1 may be performed by computing device 102 at either the front-end, back-end, or in any combination or arrangement.

Turning now to database 108, database 108 may comprise image data 110, training dataset 112, and machine learning model(s) 114. In aspects, database 108 generally stores information including data, computer instructions (e.g., software program instructions, routines, or services), or models used in embodiments of the described technologies. Although depicted as a single database component, database 108 may be embodied as one or more data stores or may be in the cloud. An example data store that is suitable for use with the present technology includes memory 612, which is described in more detail in FIG. 6.

Turning to image data 110, image data 110 may comprise labeled images. A labeled image comprises any image having associated metadata that identifies an aspect of the image. Images may be labeled by associating metadata with the image. An image may be labeled to indicate that the image is part of a category of images, e.g., a portion of images from an image corpus having a common relation. For instance, an image can be labeled to indicate that the image is part of a category, for instance, kitchenware, gardening items, jewelry, makeup, or any number of possible commonalities between images. Images can be labeled to indicate a use of an item within the image. In aspects, images can be labeled by embedding image aspects in an embedding space via a projection matrix, for example. Continuing the example, the embedded image aspects may identify a size of the item (e.g., small, medium, large) within the image, and so forth. In some aspects, the embedded image aspects may indicate a distance of a scenery object in the background of the image. In some aspects, the embedded image aspects may indicate that a portion of the background is blurred.

In some embodiments, image data 110 includes image quality data having the labels that include metadata associated with image quality, wherein the metadata indicates one or more of an angle of view, blurriness, background quality, and other image quality aspects. For example, blurriness can indicate an overall blurriness evaluation of one or more items in the image by considering various portions of the particular item individually, separately, or in various combinations. As another example, blurriness can indicate an overall blurriness evaluation of the entire image as a whole (and not just items in the image) by considering various portions of the entire image individually, separately, or in various combinations. Further, blurriness may apply only to a background of the image (not including the one or more items).

In aspects, blurriness is associated with a resolution. In aspects, blurriness may be determined on a scale of 1-10, for example, by using a spatial resolution referring to a number of pixels and an angle subtended, θ, by each pixel on a viewer's retina. For instance, an image having a better spatial resolution than a second image would have a higher number of pixels than the image. A spatial resolution may also depend upon interactions with a compressions system and a display. Further, spatial resolution may depend upon a size and a quality of an image detector. In aspects, the image detector may include one or more of a Binary Robust invariant scalable key point, speed-up robust features, and the like.

In some embodiments, wherein the metadata of labeled images may indicate the blurriness corresponding to motion blur, which may be detected using an image edge detector having at least one sensor and an algorithm that locates motion in a grid. Motion blur occurs in a time domain while capturing an image. For example, it occurs when an object is moving, by camera motion, or by a camera handshake. In embodiments, an image edge detector may detect color image edges of different hues. The edge detector may also detect a hue angle difference between two hue angles corresponding to the search image.

Turning to background quality, in embodiments, background quality may be determined using one or more quantitative characteristics of images, such as gradients of brightness, colors, saturation, and numerical values obtained from subjecting a specific image to one or more of multiplication, addition, exponentiation, and convolution with a given set of digital filters, for example. As an example, the gradients of brightness, color, and saturation may vary for one portion of an image compared to another portion of the image. Further, the one or more quantitative characteristics may also include a light spectrum for a scene within a portion of the image. Additionally, in some embodiments, the embeddings or labels may also include depth data for the portion of the light spectrum for the scene. Further, in aspects, the background quality is determined using statistics computed for each image pixel, such as mathematical expectation, variance, kurtosis coefficient, algebraic and geometric moments, and so on.

In some embodiments, image data 110 may include, for example, a pixel density, a pixel density for a portion of the image that is different than the pixel density of a second portion of the image, embedded watermark information, and attribute values corresponding to a color, a size of the whole image or a size of an item in the image, cropping, angle view, time stamp, frame size, frame color, frame style, and so forth. In some embodiments, image data 110 includes an image feature vector, which may be used for computing relevancy scores corresponding to keyword tags (e.g., the category of the item within the image, such as "kitchenware"). These aspects may also be labels associated with an image, e.g., metadata associated with the image may identify the pixel density, color, size, cropping, angle view, time stamp, frame size, frame color, frame style, and so forth.

In aspects, the image data 110 may be extracted from an item listing corresponding to an image. Item listings, for example, may correspond to products available on a network-based marketplace. In some embodiments, item listings include images of the products available on the network-based marketplace and additional details comprising a product condition, a product rating, a purchase pattern, a product identification, a product category, a brand, a style, a size, a seller identification, a color, an available quantity, a price (e.g., list price, sale price, or current auction price or bid), a number of products previously sold, and any other suitable information related to sale, purchase, or interaction with the product.

Turning now to training dataset 112, the training dataset 112 includes particular images of the image data 110. For example, the training dataset 112 may include images having particular image aspects (e.g., pixel density, spatial resolution and number of independent pixel values per unit length, optical resolution, atmospheric distortion, focus, etc.) of a search image above one or more particular thresholds. For example, in one aspect, the training dataset 112 comprises images grouped based on a spatial resolution that is within a particular range, similar ground sample size within a particular range, a number of independent pixel values per unit length being within a particular range, and similar background qualities (e.g., the background is lighter for a dark item).

Turning now to machine learning model(s) 114, machine learning algorithms or networks may be trained using training dataset 112. In embodiments, the machine learning model(s) 114 is a neural network, such as a convolutional neural networks (CNNs). In embodiments, the machine learning model(s) 114 is a random forest model. In aspects, the machine learning model(s) 114 can include many different sizes, numbers of layers and levels of connectedness. For neural networks trained with large datasets, a number of layers and a layer size can be increased by using dropout for overfitting.

In some embodiments, a neural network can be designed to forego use of fully connected upper layers at the top of a network. In some embodiments, a number of learned parameters may be reduced by forcing the network to go through dimensionality reduction in middle layers. In some embodiments, the machine learning model(s) 114 can be configured using embeddings, batch normalization, layer normalization, gradient clipping, attention mechanisms, etc.

In some embodiments, the machine learning model(s) 114 is an image quality indication model usable by the image quality identifier 122. In aspects, the CNN described above may be used as the image quality indication model for providing output for an image quality indication. In some embodiments, training dataset 112 is used by the image quality indication model to output the image quality indication based on image quality aspects (e.g., angle of view, the blurriness, or the background quality) of the search image.

In some embodiments, training dataset 112 is used by the image quality indication model as the input. In some embodiments, pretrained weights are used for generating training datasets 112 for inputting one or more training datasets 112 into the image similarity determination model, the pretrained weights corresponding to a particular category (e.g., kitchenware, gardening items, jewelry, makeup, etc.) associated with the search image. In some embodiments, the pretrained weights correspond to a particular pixel density, color, size, cropping, angle view, time stamp, frame size, frame color, frame style, and so forth. In some embodiments, the pretrained weights correspond to a resolution, an item size, and an image size. For example, images without a frame may be preferred for a training dataset.

In some embodiments, the training dataset 112 is generated for the image quality indication model based on intermediate results of analyzed images (during or after training). Continuing the example, the intermediate results of the analyzed images may be stored in the database 108 over a period of time and may be stored according to a category associated with each analyzed image. For example, a classifier may classify each image as having one or more associated particular categories. In aspects, a set of the intermediate results may be stored based on having an identified category of jewelry. Additionally, a subset of the set of the intermediate results may be stored based on having an identified category as rings having a particular percentage range of gold and a particular percentage range of alloying metal. Further, the classified images may be associated with a particular category based on generated feature vectors. Class information regarding the analyzed images may also be generated and stored in the database 108.

In some embodiments, the machine learning model(s) 114 is an image similarity determination model. In aspects, the CNN described above may be used as the image similarity determination model for providing output for an image similarity of a particular image to a search image. For example, the CNN can be trained using the training dataset 112 to recognize item similarities. Once trained, the CNN can output a confidence score indicating the likelihood that the CNN has correctly identified the similarity of the particular image to the search image.

In some embodiments, training dataset 112 is used by the image similarity determination model as training input. In some embodiments, pretrained weights are used for generating training datasets 112 for inputting one or more training datasets 112 into the image similarity determination model. In some embodiments, the pretrained weights correspond to particular weights of similarity vectors. For example, vectors corresponding to particular features in an image may be extracted. In some embodiments, a vector similarity algorithm may be used to extract the particular features. For example, the particular feature may include a color of a particular item in an image (e.g., a light blue car) and a percentage of the color with respect to the entire car. In some embodiments, the similarity vectors are associated with a particular category (e.g., kitchenware, gardening items, jewelry, makeup, etc.). For example, the vector similarity algorithm may identify and extract items within images in the image corpus that are similarly categorized.

In some embodiments, vectors may be generated based on embedded image aspects. In aspects, "embedded" image aspects improve semantic representations of data objects for measuring similarities between images having the data objects. Embedding is a technology uses numerical representation of words, sentences, or other textual content, such as a vector representation for machine learning model(s) 114 to utilize. For example, embedding maps words or phrases to a corresponding vector of real numbers, which provides for improved dimensionality reduction and contextual similarity (e.g., improved compared to other technologies, such as "bag or words" approach). As such, a training dataset 112 may be generated based on embedded image aspects, such as a size of a target item (e.g., small, medium, large) within a corresponding image, a height of a particular feature of the target item (e.g., the height of a bedpost), a pattern of a portion of the item (e.g., black and blue stripes covering 40% of a shoe), and so forth.

Turning now to visual search recommendation engine 114, visual search recommendation engine 114 comprises image R/T component 118, performance identifier 120 comprising image quality identifier 122 and image similarity determiner 124, and image recommendation generator 126.

Beginning with image R/T component 118, image R/T component 118 generally receives or transmits information between visual search recommendation engine 114 and network 104. Image R/T component may receive one or more search images for a search query at the search engine 106. For example, R/T component 118 may receive a photo to be used as a search image. The received photo may have been captured via a camera of the computing device 102. In some embodiments, the R/T component 118 may receive an upload of the image from a photo gallery accessible to the computing device 102 or an image stored locally on the computing device 102. The one or more search images may include one or more items within the image and may have various image aspects and item features that correspond to the one or more items. The one or more items in a search image may correspond to one or more categories, such as books, music, video games, collectibles, antiques, art (e.g., landscape paintings and art glass), and so forth. As such, image R/T component 118 transmits the search image to the search engine 106.

Further, image aspects may be extractable from the search image or determined based on memory data. The image aspects may include orientation, brightness, and user usage.

Beginning with orientation, an "aspect ratio" of a search image is the ratio of its width to its height. When the search image has an aspect ratio higher than 1, the search image has "horizontal orientation." When the search image has an aspect ratio lower than 1, the search image has "vertical orientation."

Turning to brightness, in aspects, images stored in a gallery may have higher brightness features than search images taken directly from the camera of computing device 102. An item corresponding to a search image may have various brightness features at various portions of the item. Further, images stored in a gallery may include both user-generated images and professional studio photos locally stored and taken by a different device. In embodiments, the professional studio photos have a total brightness score that is greater than the total brightness score of the user-generated images.

Turning to user usage, the user usage of an image may include a number of times the user viewed the image, a number of times the image was edited by the user, a number of times the image was transmitted from the computing device 102, a total length of time the user viewed the image since its upload or capture, and the like.

Turning now to image quality identifier 122, the image quality identifier 122 may be an image quality indication model (as discussed above with respect to the machine learned model(s) 114). For example, as discussed above, the image quality indication model may be a CNN. Based on an input image, the image quality identifier 122 provides an image quality indication as an output. The image quality indication is based on image aspects of the search image, such as angle of view, blurriness, background quality, frame, and watermarks, for example. In general, the image quality indication model may be configured to: extract training datasets 112 necessary for learning from image quality data stored in the database 108, preprocess the training datasets 112 for increasing the accuracy of the training dataset, and to output the image quality indication once trained.

In aspects, a search image may be provided as an input into the trained image quality identifier 122. In aspects, the trained image quality identifier 122 was trained to output the image quality indication based on a training dataset 112 comprising labeled images that were labeled based on one or more of: angle of view, blurriness, background quality, a resolution, an item size, an image size, orientation, brightness, and user usage. In embodiments, data preprocessing may refer to removing or modifying the image data 110 within the training dataset 112 to increase the accuracy of the training dataset 112 for subsequently determining image quality indications. For example, duplicate image quality data (e.g., an angle of view, blurriness, background quality, blurriness, and other image quality aspects) may be reduced and adjusted to increase the accuracy for output determinations. Further, the data preprocessing may include data refinement, data integration, data transformation, data reduction, etc. The data refinement may include filling in missing values, smoothing noisy data, identifying outliers, and to correcting data inconsistency.

Once trained, the trained image quality indication model outputs the image quality indication based on an input of one or more images. In embodiments, the image quality indication corresponds to how accurately a search may be performed using the corresponding input image. In addition, the image quality indication may also correspond to how fast a search may be performed using the corresponding input image compared to other images. In embodiments, the input of the one or more images into the trained image quality indication model may include a search image. In some embodiments, the one or more images are from an image corpus. The image corpus may include each image saved to one or more databases and corresponding to an application, for example. In embodiments, the application is an e-commerce application. In some embodiments, the images of the image corpus may include all images uploaded by a seller on the e-commerce application during a particular time period.

With respect to the image quality indication, an image having a brightness score within a particular range may have a higher image quality indication than an image quality indication of an image having a brightness score outside the particular range. The particular range may depend on other image quality aspects, such as hue and saturation, for example. As another example, an image having a size within a particular range may have a higher image quality indication than an image quality indication of an image having a size outside the particular range. As another example, an image having a watermark may have a lower image quality indication than an image quality indication of an image not having a watermark. As another example, an image having additional items in the background of the image may have a lower image quality indication than an image quality indication of an image not having those additional items.

As discussed above with respect to training datasets 112, training datasets 112 for training the image similarity determination model may have pretrained weights. Continuing the example, for an input image that has image quality aspects associated with these pretrained weights that are below a threshold, the image similarity determination model may provide an output based on connections and nodes corresponding to these pretrained weights. In some embodiments, the output is based on multiple image quality aspects, wherein some of the image aspects have more of an impact on the output than other image aspects. For example, an input image having a blurriness score below a threshold may have a higher impact on the overall output compared to the input image having a brightness value within a particular range.

In some embodiments, an input layer of the image similarity determination model includes a plurality of nodes and one or more hidden layers. Continuing the example, the input layer may have a connection to one or more nodes of the one or more hidden layers. Further, the one or more nodes of the one or more hidden layers may be connected to nodes of the output layer for providing the output of the image quality indication. In aspects, each of these connections may be given a particular weight based on the pretrained weights from training data 112. As such, upon inputting the input image into the image similarity determination model, output nodes of the output layer that are activated may output values based on processing at the one or more hidden layers. For example, with respect to the example of the input image having the blurriness score below the threshold but having the brightness score within the particular range, processing at the hidden layer for this input image may include processing nodes that correspond to the brightness score having lower weights than processing nodes corresponding to the blurriness score.

Furthermore, as discussed above with respect to training datasets 112, training datasets 112 for training the image similarity determination model may have embedded image aspects, such as a height of a particular feature of the target item (e.g., the height of a bedpost). Continuing the example, for an input image that depicts a bedpost but does not have a bedpost depicted or has a bedpost depicted that is visually shorter than a threshold height for the bedpost of the search image, the image similarity determination model may provide an output that is lower for this input image than another input image having a bedpost height above the threshold height in the embedding. Similarly, the input image having the bedpost height visually shorter than the threshold height may also have a lower image quality indication than an input image having a bedpost height that is not visually shorter than the threshold height.

Turning now to image similarity determiner 124, image similarity determiner 124 may determine an image similarity. In aspects, the image similarity determiner 124 may be an image similarity determination model (as discussed above with respect to the machine learned model(s) 114). For example, as discussed above, the image similarity determination model may be a CNN. Based on an input image, the image similarity determiner 124 provides an image similarity as an output. In general, the image similarity determiner 124 may be configured to: extract training datasets 112 necessary for learning from image similarity data stored in the database 108, preprocess the training datasets 112 for increasing the accuracy of the training dataset, and to output the image similarity once trained.

Once trained using training dataset 112, the trained image similarity determination model outputs the image similarity based on an input of one or more images. In embodiments, the image similarity corresponds to how accurately a search may be performed using the corresponding input image. In addition, the image similarity may also correspond to how fast a search may be performed using the corresponding input image compared to other images. For example, the image similarity may include a value that is higher for one image that is more similar to a search image than another image that is less similar to the search image. For example, the search image may be Pinocchio, the image that is more similar may include image aspects corresponding to lines indicating the material is wood, and the image that is less similar may not include those features.

In some embodiments, image similarity is based on a comparison of the search image to one or more images from the image corpus (discussed above with respect to the image quality identifier 122). For example, a set of images from the image corpus may be sampled uniformly and at random. The image similarity determiner 124 may provide similarity values for each of the set of images. Further, the image similarity determiner 124 may identify a minimum and a maximum similarity value of the similarity values for each of the set of images. Continuing the example, the minimum and the maximum may be used for determining which image from the set of images will be provided as the recommended image for the search.

Continuing the example, the maximum similarity value may be associated with a category of the search image. For example, the similarity values for the set of images from the image corpus may be associated with how similar the set of images are to depicting items associated with electronics (e.g., a computer, a TV, or a radio). In some embodiments, image similarity determiner 124 determines the similarity values using one encoder for the input images (the set of images in this example) and pretrained weights that correspond to the electronics category. For example, for a search image that includes a wireless item, images within the set of images that have wires will result in lower similarity values. In some embodiments, image similarity determiner 124 determines the similarity values using embeddings that correspond to a Bluetooth capability.

In some embodiments, image similarity is based on a relevance of an item in the image compared to the item of interest in the search image. That is, the more similar the item in the image compared to the item of interest is, the more relevant the item is. Stated differently, a relevance score used for determining image similarity indicates a relatedness between item features of an item in an image (e.g., from an image corpus) and item features of an item in the search image. In addition, selevance may correspond to categories identified for the search image (e.g., "kitchenware" and "knives"). For example, a knife for the kitchen would be more relevant in this example than a knife for self-defense.

Furthermore, relevance may also correspond to a number of times a particular item was purchased for other similar searches. For example, an image having three visual image aspects in common with the search image, wherein the image is from an image corpus for an e-commerce application, and wherein the image corresponds to one million purchases between Jan. 20, 2019 and Jan. 20, 2021, may be more relevant than a different image from the corpus having three visual image aspects in common with the search image but corresponding only to two purchases between Jan. 20, 2019 and Jan. 20, 2021.

In aspects, image similarity determiner 124 may convert a relevance score for an image into a binary relevance rating that indicates whether a feature vector corresponding to an image aspects of an image is relevant. As discussed above with respect to the machine learned model(s) 114 (e.g., the image similarity determination model), vectors corresponding to particular features in an image may be extracted. The binary relevance rating for the feature vector may indicate whether that feature is relevance and may further be mapped for distance determinations. For example, the distance determinations (such as Euclidean distances between feature vectors of the images from the image corpus) may be used for determining an image similarity, which is used for determining which image from the image corpus will be provided as the recommended image for the search.

In some embodiments, the relevance may be determined based on sizes of items in an image. In one aspect, if an image has two items depicted and one item is three times the size of the other item, the one item is identified as the relevant item. As another example, relevance may be determined using item recognition and user intent. To illustrate, user intent may be determined by identifying items in item listing images and comparing the items to a population of stored images or a sample of the stored images specific to a particular search engine, and identifying the most relevant item in the item listing images. For example, if the user intent is to shop online for products offered by a particular website and the uploaded image contains three items including a woman wearing a pair of sunglass and a large sun in the background, image similarity determiner 124 will then classify the sunglasses as the most relevant item in the image.

In some embodiments, the image similarity determiner 124 can perform item key point image aspect identification and key point spatial information coding, descriptor encoding functionality to encode descriptors, and query compression for transmission as part of a visual search request. In some embodiments, local-feature algorithms extract image aspects that do not vary based on scale or resolution of the item in the image. In some embodiments, a computer vision database extracts metadata describing an item listing image. In some embodiments, color, shape, and texture corresponding to the item are extracted from the image via local descriptors (e.g., by using scale invariant feature transform or speed up features from feature points detected within the image). In some embodiments, hash-based algorithms are used to perform wavelet transformation for compressing extracted aspects.

In some aspects, the image similarity determiner 124 determines a post-retrieval image similarity. For example, the image similarity determiner 124 may determine a set of search results based on the search image. Further, the image similarity determiner 124 then ranks the search results using a ranker. Rankers are known in the art and in common use by search engines. Image similarity determiner 124 then selects a subset of the search results. The subset may be selected based on the ranking. For instance, the image similarity determiner 124 can identify one or more top ranked search results. Additionally, the image similarity determiner 124 can identify a lowest ranked search result. In embodiments, top ranked search results can be identified based on the top ranked search results each having an image similarity score that is above a threshold. Continuing the example, the top ranked search results each have a higher image similarity than those images that are not among the top ranked search results.

As such, image quality identifier 122 and image similarity determiner 124 are used to provide the search query performance identifier 120. In aspects, the search query performance identifier identifies a recommended image for the search. In aspects, the image quality indication and the image similarity indicate a search query performance for the search image. For example, the search query performance for the search image corresponds to how accurately a search may be performed using the recommended image. In addition, the search query performance may also indicate to how fast a search may be performed using the recommended image.

In aspects, search query performance is a value usable to ascertain the validity of the target search results. For example, when the value is low, the target search results are likely to be inaccurate. Continuing the example, a new image would be needed for the search query in an attempt to obtain a higher value for the search query performance indicative of relevant target search results. In some embodiments, a search query performance may comprise indicators for one or more of the following features of the search engine 106 executing test search queries using a test search configuration: a response-time, an error rate, a memory consumption, and a CPU consumption.

In aspects, the search query performance is a combination of the image quality indication and the image similarity. For example, in some aspects, the image similarity has a higher weight on the search query performance than the image quality indication. In some aspects, the search query performance is determined based on a set of images from the image corpus having an image quality indication above a threshold, and then subsequently determining image similarity for the set of images. In some aspects, the image quality indication and the image similarity are determined simultaneously using parallel processing, and subsequently an image is identified as exceeding a search query performance of the search image. In some aspects, a plurality of images from the image corpus are identified as having a corresponding image quality indication above a first threshold and a corresponding image similarity above a second threshold. Continuing the example, the plurality of images are then ranked according to a determined search query performance for each of the plurality of images.

Turning now to image recommendation generator 126, the image recommendation generator 126 may provide for display at the search engine a first image as a recommended image based on the search query performance identified by the search query performance identifier 120. In aspects, the image recommendation generator 126 provides the recommended image for display as in FIG. 6 on a graphical user interface. In aspects, the recommended image is provided as a selectable option and is provided as the search query for identifying search results upon a selection of the selectable option. In aspects, image recommendation generator 126 provides the plurality of images that were ranked according to a determined search query performance as selectable options. Upon selection of a selectable option, a set of search results are provided. In some embodiments, the image recommendation generator 126 also provides for display at the search engine values corresponding to the image quality indication, the image similarity, and the search query performance.

Figure 2A:
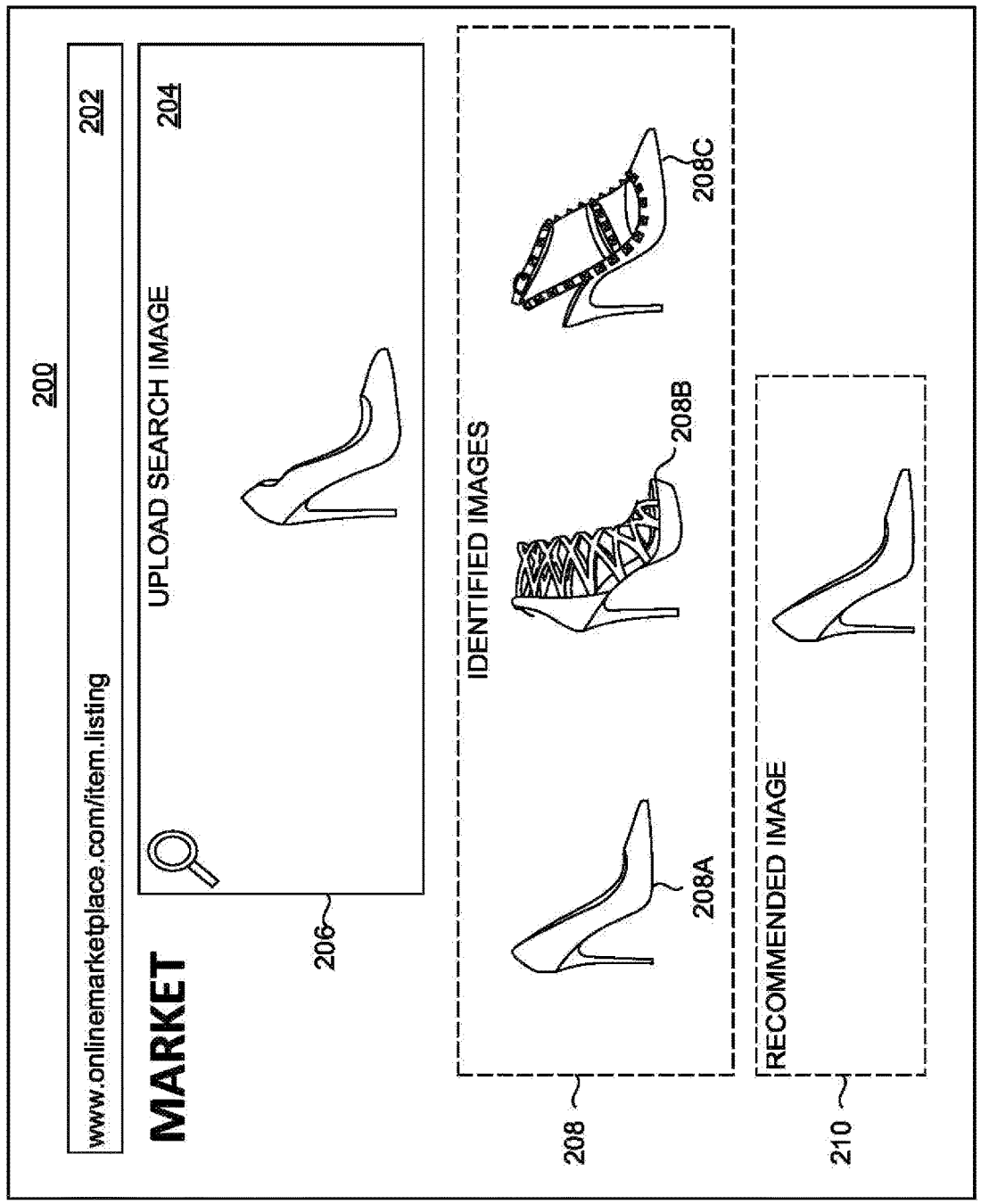

Turning now to FIG. 2A, example graphical user interface (GUI) 200 is displayed to a user at a display device. Here, an online market place 202 provides item listings that may be determined by search engine 206 employing the visual search recommendation engine 114. As illustrated, an image may be dragged or uploaded to the search query input 204. For example, search image 206 corresponding to "women's heels" is received as a search query at a search engine. Stated differently from the perspective of a user, example search image 206 is provided as a search query at the search engine. In response to search engine 106 receiving the search query from the image R/T component 118, identified images 208 are provided for display on the GUI 200. In aspects, a plurality of images 208 are identified from an image corpus.

In some embodiments, the search image 206 comprises a first aspect and a second aspect. For example, search image 206 may have a first aspect that is a color and a second aspect that is a heel length. As another example, search image 206 may have a first aspect that is a pattern and a second aspect that is a material. In aspects, the plurality of images 208 that were identified may have the first aspect or the second aspect. For example, one of the images 208 may have the first aspect and another one of the images 208 may have the second aspect. Stated differently, identified images 208 comprising item listing images 208A-208C each have at least one aspect in common with search image 206. For example, 208A-208C each have a heel size within a range of the heel size of search image 206. Image 208A has a first aspect (closed toe) in common with search image 206 and image 208B does not have the first aspect in common with search image 206.

In aspects, a selection of a category is received at the search engine 206. For example, a category for example GUI 200 may include "shoes" or "women's heels." In some aspects, a category may include "blue shirts." In some aspects, a category may include "consumable food" or "telemedicine." Continuing the example, images may be identified that are associated with the selected category. For example, logo images may be identified with various telemedicine services provided online. In aspects, an image similarity determination made by image similarity determiner 124 may be determined from the images identified as associated with the selected category.

In aspects, the identified images 208 are identified based on image aspects and item features of the search image 206. For example, a subset of identified images 208 may be presented on GUI 200, and the subset of the identified images 208 may be presented in a predetermined order based on user interaction histories from prior search queries at the search engine. In some embodiments, identified images 208 comprise item listing images 208A-208C. In aspects, the item listing images 208A-208C are retrieved from a database storing item listing images that were uploaded by sellers via an e-commerce application.

In some embodiments, image 208A is a closed-toe heel that is longer than two inches and completely covers the foot; image 208B is an open-toe heel that is also longer than two inches and does not completely cover the foot; image 208C is a closed-toe heel that is longer than two inches and does not completely cover the foot. In aspects, the identified images 208 each have heels longer than two inches based on a detected similar feature in the search image 206. In one aspect, image 208A is the recommended image 210.

In aspects, recommended image 210 has a search query performance indicated by the image quality indication and the image similarity associated with the search image 206. In aspects (not depicted), more than one image is recommended. In some aspects, the more than one image is selectable for a search at a search engine. Stated differently, the GUI 200 may display a set of identified images comprising a first image and a second image that both exceed the search query performance of the search image, and the first image and the second image may be presented as selectable options. Further, either of the first image and the second image may be selected as the search query for identifying search results.

Receiving a Selection of One of the Selectable Options

In an embodiment, GUI 200 further provides for display one or more of the following: the image quality indication, the image similarity, and the search query performance for the recommended image 210. In some embodiments, the search query performance is a value or a percentage. In some embodiments, more than one recommended image 210 (not depicted) is provided for display. In aspects, the recommended image 210 is selectable. Continuing the example, upon selection of the recommended image, search results may be provided. Upon providing the search results, a post-search query performance may also be provided.

Turning now to FIG. 2B, example GUI 200 displays a search results page to a user at a display device based on a selection of the recommended search image 210 that is image 208A (from FIG. 2A). In aspects, the recommended search image 210 exceeds the search query performance indicated by the image quality indication and the image similarity of the search image. In some embodiments, recommended image 210 from FIG. 2A is provided as the search image at search query input 204.

Based on the selection of the recommended image 210, GUI 200 displays search results 212 comprising search results 212A and search result 212B. In some aspects, the GUI 200 displays search results 212 upon receiving a selection of the recommended image 210 presented as a selectable option in FIG. 2A. In some aspects wherein the more than one image is recommended, the search results 212 include a subset of images from the image corpus and are based on the selection of one of the more than one recommended images. In some aspects, the subset of images displayed as search results 212 each include a first aspect of the recommended image selected. For example, the image 212A has a closed toe.

In one aspect, search result 212A is a closed-toe heel that is longer than two inches and completely covers the foot. In one aspect, search result 212B is also a closed-toe heel that is longer than two inches and completely covers the foot. In one embodiment, search result 212A has a heel that is slightly shorter than the heel of search results 212B. In one embodiment, search result 212A covers less of a top portion of the foot near the toes than search result 212B. Stated differently, in some embodiments, at least two search results have at least one similar aspect of the item in each image and at least one dissimilar aspect of the item in each image.

In some embodiments, more than two search results 212 (not depicted) are provided for display. In aspects, each of the search results 212 are selectable. In some aspects, GUI 200 provides listing information (e.g., price, material, heel height, etc.) for display near the search results 212, upon selection of one of the search results 212, or upon hovering over one of the search results 212. Continuing the example, upon selection of one of the search results 212, the user may be taken to a third party webpage or to a different page associated with the online market place 202. Upon providing the search results, a post-search query performance may also be provided. The post-search query performance may be a value or a percentage in some aspects.

In aspects, a subset of the search results 212 are selected based on a ranking of the search results presented. For example, 212A may be ranked higher than 212B based on having a higher search query performance. In addition, a post-retrieval image similarity may be determined based on a comparison between the subset of images and the search image 210. Additionally, the search query performance of the search image may be indicated further based on the post-retrieval image similarity. For example, the rankings of 212A and 212B may be updated based on the post-retrieval image similarity.

Figure 3:
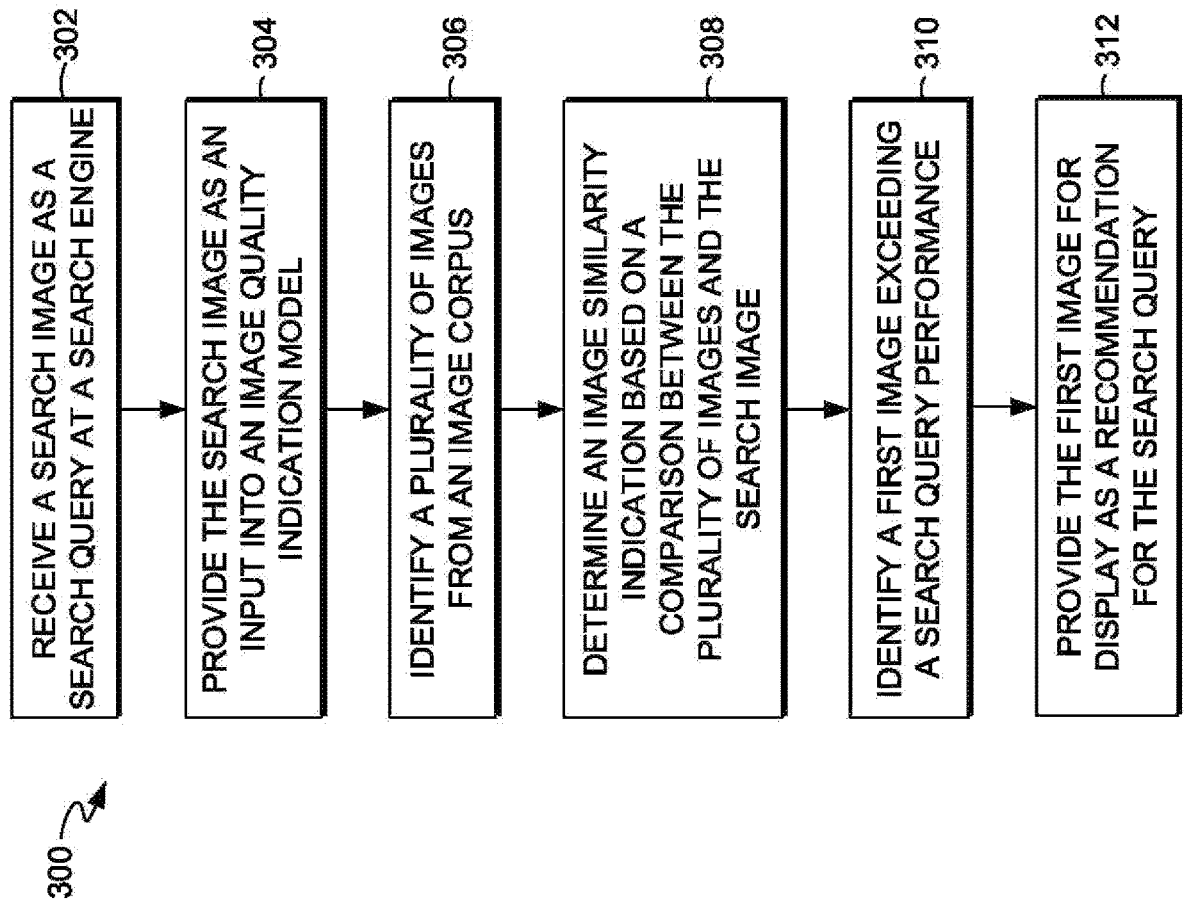
FIGS. 3-5 are block diagrams of example methods for generating a recommended image using the visual search recommendation engine of FIG. 1, in accordance with aspects described herein.

Turning now to FIG. 3, block diagram 300 begins with receiving a search image as a search query at a search engine at step 302. By way of example, the search query is for an inventory listing in a product listing inventory. In aspects, the search query is processed to generate a signature based on a vector representation of the search query in a vector space. In some embodiments, the inventory listings in the product listing inventory may each be associated with a category in an inventory index. The category association may be determined using an offline process. In some aspects, a relevant category is determined for the search query upon receiving the search query.

In some embodiments, the search image comprises a first aspect and a second aspect, and the first image of the set of identified images comprises the first aspect and the second image of the set of identified images comprises the second aspect. In some embodiments, the first image comprises the first aspect and not the second aspect, and the second image comprises the second aspect and not the first aspect.

Turning to step 304, the search image is provided as an input into an image quality indication model. In aspects, the image quality indication model may form all or part of a cloud (e.g., a geographically distributed set of multiple machines configured to function as a single server), which may form all or part of a network-based system (e.g., a cloud-based server system that provides network-based services to user devices). In some embodiments, the image quality indication model may provide output that may be used for determining whether an image aspect for a current image frame of an image of an image corpus satisfies an image quality threshold. The threshold may correspond to a frame of the corresponding image as a whole or to sub-portions of the image frames. In some aspects, a deep neural network is utilized for detecting objects within the images. In some embodiments, the image quality indication model is trained to output an image quality indication based on image aspects (e.g., angle view, hue, background, etc.) of the search image.

Turning to step 306, a plurality of images are identified from an image corpus. For example, the image corpus may comprise various subsets of inventory item listings selected from an entire corpus of inventory item listings stored on a database, the subsets based on one or more criteria. In some embodiments, the plurality of images may be identified based on having an association with a selected or predetermined category. In some embodiments, a selection of a category is received at the search engine and the plurality of images are identified based on the selection of the category.

Turning to step 308, an image similarity for the plurality of images or a subset of the plurality of images is determined based on comparing the plurality of images or the subset from the image corpus and the search image. In aspects, the image similarity is determined by an image similarity determination model. In embodiments, the image similarity determination model may provide the image similarity (e.g., a score) once trained from image groups satisfying a relevance criteria and feature vectors and a similarity function. Further, the image quality indication and the image similarity indicate a search query performance for the search image. In some embodiments, the image similarity is determined for the plurality of images identified based on the selected category. In some embodiments, the image similarity is determined for the plurality of images identified based on having the association with the predetermined category.

Turning to step 310, a first image that exceeds a search query performance indicated by the image similarity and the image quality indication is identified. In aspects, the search query performance is a pre-processing indication of the query prior to execution of the query to provide an estimated performance indication to the query. One pre-processing indication may include a runtime for the query. As another example, another pre-processing indication may include a severity of an error of the search query performance. Continuing the examples, the pre-processing indications of the search query performance may be stored in a database and mapped to various query attributes associated with particular visual search queries.

Turning to step 312, the first image is provided for display as a recommendation for the search query. In aspects, a query interface may display additional details, such as an estimated runtime for the query. In some embodiments, the recommendation may be changed based on receiving a selection of a category. In some embodiments, the recommendation may be changed based on receiving a selection of a threshold for a runtime. In some embodiments, the recommendation may be changed based on receiving a selection of a threshold for the search query performance.

Figure 4:
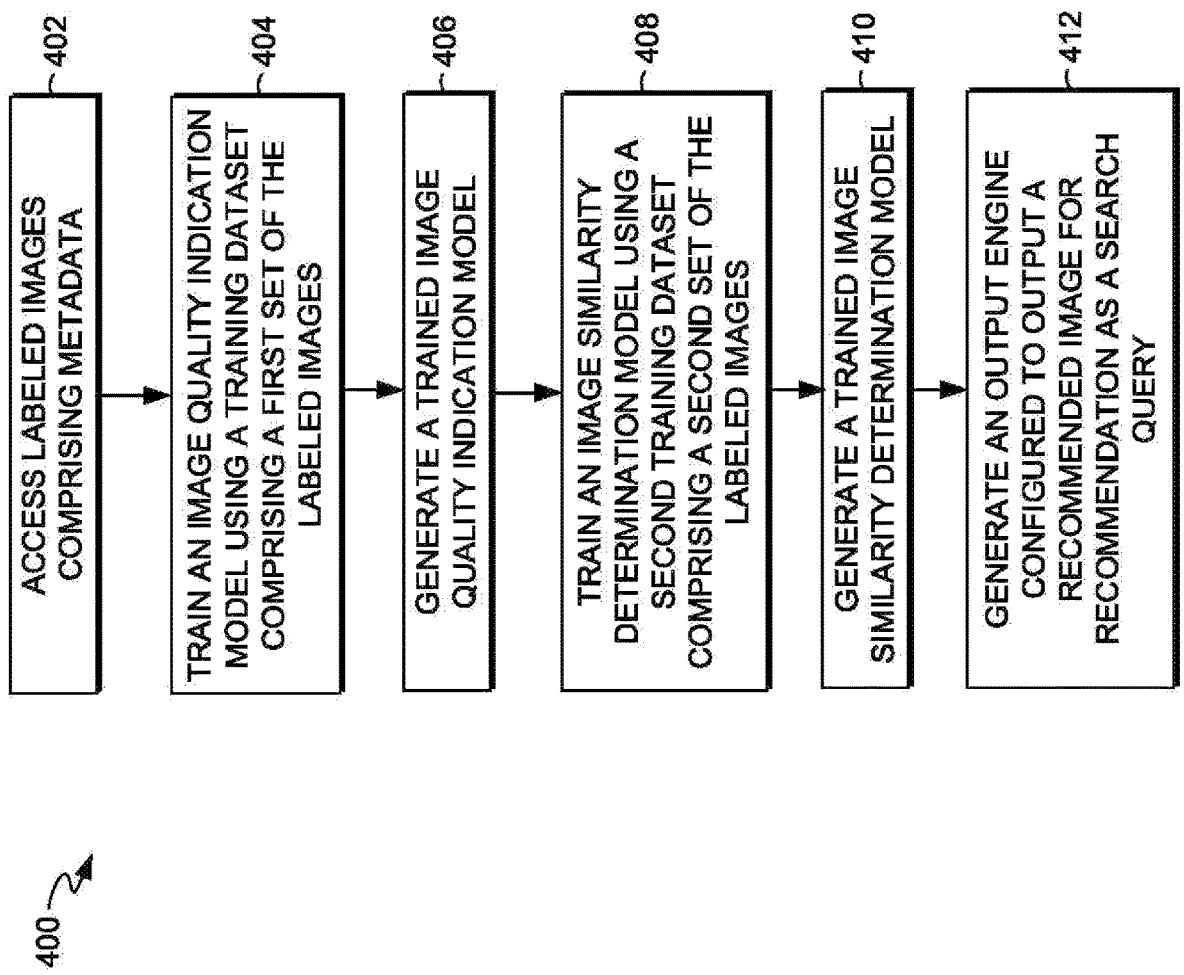

Turning now to FIG. 4, block diagram 300 begins with accessing labeled images comprising metadata at step 402. The metadata may be associated with image quality. Further, the metadata may indicate an angle of view, blurriness, or background quality. In some embodiments, the metadata may indicate gradients of brightness, color, and saturation.

Turning to step 404, an image quality indication model is trained using a training dataset comprising a first set of labeled images. In aspects, the image quality indication model is trained to output image quality indications of input images based on the angle of view, the blurriness, or the background quality. In aspects, the image quality indication model is trained to output image quality indications of input images based on gradients of brightness, color, and saturation. As such, a trained image quality indication model is generated based on the training at step 406.

Turning to step 408, an image similarity determination model is trained using a second training dataset comprising a second set of labeled images. In aspects, the second set of labeled images are labeled based on image latent vectors. In aspects, the image latent vectors correspond to a randomly generated latent vector that is usable via an image generation neural network to generate images. In aspects, the relationship among the latent vectors relates to one or more attributes based on a feature space (e.g., corresponding to an attribute) in a latent space, allowing the latent vector to be shifted to correspond with a desired attribute. For example, the latent vector may shift to a feature space corresponding to the desired attribute when another feature space for the latent vector does not correspond to the desired attribute. As an example, the desired attribute may be selectable by a user and may correspond to a particular colored dress of a particular length. As such, a trained image similarity determination model is generated based on the training at step 410.

Turning to step 412, an output engine is generated to output a recommended image for recommendation as a search query. In aspects, the recommended image is recommended based on identifying an image exceeding an image quality indication of an input image using the trained image quality indication model. Additionally, the recommended image may also be recommended based on the recommended image having the image similarity exceeding the image similarity of the input image using the image similarity determination model.

Figure 5:
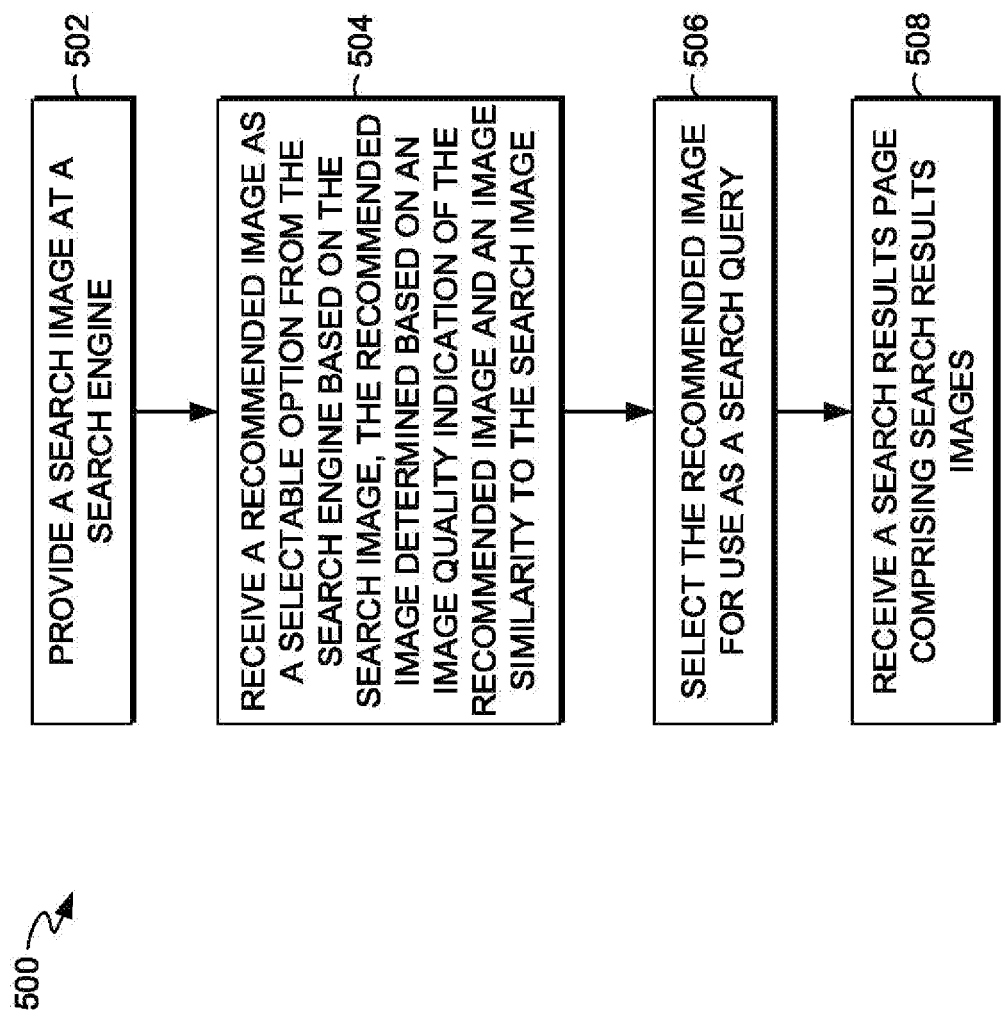

Turning now to FIG. 5, block diagram 500 begins with providing an image at a search engine at step 502. The image may be received, for example, from the image R/T component 118 from a computing device, such as computing device 102. At step 504, a recommended image is received as a selectable option from the search engine based on the search image. For example, the recommended image may be determined based on (1) an image quality indication of the recommended image exceeding the image quality indication of the search image as determined by a trained image quality indication model and (2) an image similarity of the recommended image exceeding the image similarity of the search image as determined by a trained image similarity determination model.

Turning to step 506, the recommended image is selected for use as a search query at the search engine. Based on this selection, a search results page comprising search result images corresponding to the selected recommended image is received at step 508. In some aspects, a set of the search result images corresponding to the selected recommended image are received. Continuing the example, the set of the search result images may be received based on the set exceeding the image quality indication and the image similarity. In aspects, the set of the search result images are presented as selectable options.

Having described an overview of embodiments of the present technology, an example operating environment in which embodiments of the present technology may be implemented is described below in order to provide a general context for various aspects. Referring initially to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated. Computing device 600 is suitable for performing computerized methods, including the methods or any variation of that have been discussed, using one or more processors.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

Figure 6:
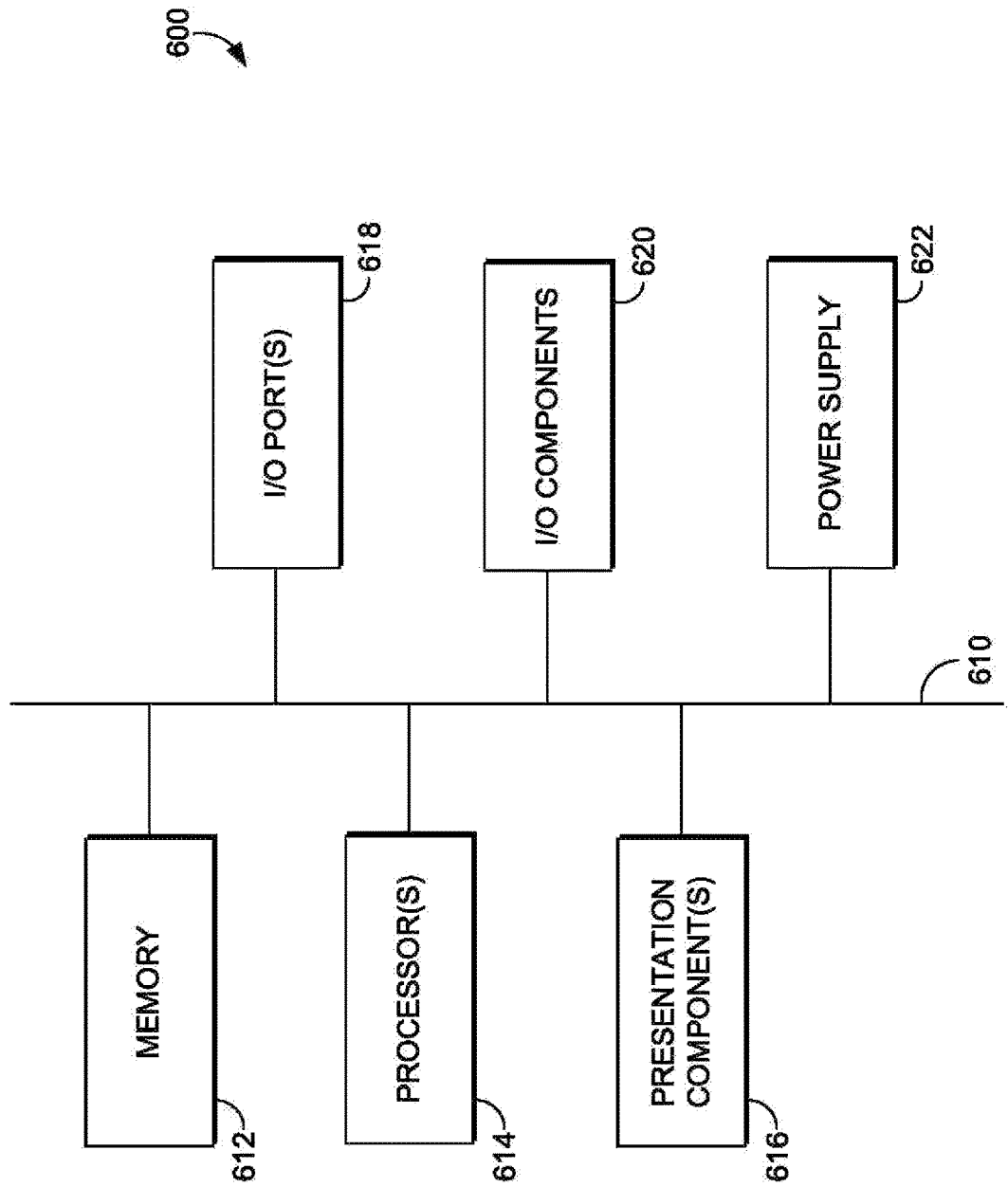
FIG. 6 is an example computing device suitable for implementing the described technology, in accordance with an aspect described herein.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, a camera, a joystick, a game pad, a satellite dish, a scanner, a printer, a wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further the word "communicating" has the same broad meaning as the word "receiving" or "transmitting" facilitated by software or hardware-based buses, receivers, or transmitters using communication media. Also, the word "initiating" has the same broad meaning as the word "executing" or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: One or more non-transitory computer storage media storing computer-readable instructions that when executed by a processor, cause the processor to perform operations for a visual search recommendation, the operations comprising: receiving a search image as a search query at a search engine; providing the search image as an input into an image quality indication model, the image quality indication model trained to output an image quality indication based on image aspects of the search image; identifying a plurality of images from an image corpus; determining an image similarity based on a comparison between the plurality of images from the image corpus and the search image, wherein the image quality indication and the image similarity indicate a search query performance for the search image; identifying a first image exceeding the search query performance indicated by the image quality indication and the image similarity of the search image; and providing for display at the search engine, the first image as a recommendation for the search query.

Aspect 2: Aspect 1, wherein identifying the plurality of images from the image corpus further comprises: receiving a selection of a category at the search engine; and identifying images within the image corpus that are associated with the selected category, wherein the image similarity is determined from the images identified as associated with the selected category.

Aspect 3: Any of Aspects 1-2, further comprising: retrieving a first set of search results for the search image from the image corpus; selecting a subset of images from the first set of search results based on a ranking of the first set of search results; and determining a post-retrieval image similarity based on a comparison between the subset of images and the search image, wherein the search query performance of the search image is indicated further based on the post-retrieval image similarity.

Aspect 4: Any of Aspects 1-3, further comprising: displaying a set of identified images, the set of identified images comprising the first image and a second image that exceeds a second search query performance of the search image, the set of identified images being presented as selectable options; receiving a selection of one of the selectable options; and providing the one of the selectable options selected as the search query for identifying search results.

Aspect 5: Any of Aspects 1-4, wherein the search image comprises a first aspect and a second aspect, and wherein the first image of the set of identified images comprises the first aspect and the second image of the set of identified images comprises the second aspect.

Aspect 6: Any of Aspects 1-5, further comprising providing a subset of images from the image corpus based on the selection of the first image, wherein each image of the subset of images includes the first aspect associated with the first image.

Aspect 7: Any of Aspects 1-6, further comprising training the image quality indication model to output the image quality indication based on a training dataset comprising labeled images, the labeled images being labeled based on one or more of angle of view, blurriness, and background quality.

Aspect 8: Any of Aspects 1-7, wherein the trained image quality indication model is a convolutional neural network.

Aspect 9: A computer implemented method for a visual search recommendation, the method comprising: accessing labeled images comprising metadata associated with image quality, the metadata indicating an angle of view, blurriness, or background quality; training an image quality indication model using a training dataset comprising the labeled images, wherein the image quality indication model is trained to output image quality indications of input images based on the angle of view, the blurriness, or the background quality; generating an image similarity determination model, wherein the image similarity determination model determines image similarity between images of an image corpus based on image latent vectors; and generating an output engine configured to output a recommended image for recommendation as a search query, the recommended image based on identifying an image exceeding a search query performance for a search image determined based on an image quality indication of the recommended image determined using the trained image quality indication model and an image similarity determined using the image similarity determination model.

Aspect 10: Aspect 9 the output engine further configured to output the recommended image based on the image similarity of the recommended image having a maximum image similarity compared to image similarities.

Aspect 11: Any of Aspects 9-10, wherein the image similarity determination model comprises a convolutional neural network, the convolutional neural network trained to determine the image similarity.

Aspect 12: Any of Aspects 9-11, wherein the image quality indication model is trained to output the image quality indications of the input images based on a resolution.

Aspect 13: Any of Aspects 9-12, wherein the image quality indication model is trained additionally based on a resolution, an item size, or an image size.

Aspect 14: Any of Aspects 9-13, wherein the image similarity determination model determines the image similarity based on intensity patterns within the images, and wherein the images are selected for determining the image similarity based on each of the images being with a same category.

Aspect 15: A system for a visual search recommendation, the system comprising: at least one processor; and one or more computer storage media storing computer-readable instructions that when executed by the at least one processor, cause the at least one processor to perform operations comprising: providing a search image at a search engine; receiving a recommended image as a selectable option from the search engine based on the search image, wherein the recommended image is determined based on the recommended image having a search query performance that exceeding a search query performance of the search image, the search query performance of the recommended image and the search query performance of the search image determined from an image quality indication determined by a trained image quality indication model and an image similarity determined by a trained image similarity determination model; selecting the recommended image for use as a search query at the search engine; and receiving from the search engine a search results page comprising search result images corresponding to the selected recommended image.

Aspect 16: Aspect 15, further comprising: receiving a set of the search result images corresponding to the selected recommended image, the set of the search result images exceeding the search query performance of the search image, the set of the search result images being presented as selectable options; and selecting one of the selectable options.

Aspect 17: Any of Aspects 15-16, further wherein the trained image quality indication model was trained using a plurality of item listing images associated with an image aspect of the search image, and wherein the trained image quality indication model is a convolutional neural network.

Aspect 18: Any of Aspects 15-17, further comprising: receiving a set of search results identified for the search image, the set of search results including rankings for of each of the set of search results, the rankings based on embeddings of each of the set of search results, the embeddings corresponding to a category; selecting a subset of images from the set of search results based on the rankings; and receiving the recommended image for use as the search query based on the subset of images selected.

Aspect 19: Any of Aspects 15-18, wherein the recommended image is recommended based on a post-retrieval image quality indication determined by the trained image quality indication model, the trained image quality indication model using an item size, an image size, or background quality.

Aspect 20: Any of Aspects 15-19, wherein the trained image quality indication model is trained to output the image quality indication based on a resolution and a category of the search image.

What is claimed is:

1. One or more non-transitory computer storage media storing computer-readable instructions that when executed by a processor, cause the processor to perform operations for a visual search recommendation, the operations comprising:
  receiving a search image as a search query at a search engine;
  providing the search image as an input into an image quality indication model, the image quality indication model trained to output an image quality indication based on image aspects of the search image;
  identifying a plurality of images from an image corpus;
  determining a search query performance for the search query based on the image quality indication and an image similarity between each of the plurality of images and the search image;
  identifying a first image exceeding the search query performance indicated by the image quality indication and the image similarity;
  providing for display at the search engine, the first image as a recommendation for the search query;
  receiving a selection of the first image recommended;
  providing for display at the search engine, a set of search result images corresponding to the selection of the first image, the set of search result images exceeding the search query performance of the search image; and
  receiving a selection of one of the set of search result images.

2. The media of claim 1, wherein identifying the plurality of images from the image corpus further comprises:
receiving a selection of a category at the search engine; and
identifying images within the image corpus that are associated with the selected category, wherein the image similarity is determined from the images identified as associated with the selected category.

3. The media of claim 1, further comprising:
prior to determining the search query performance, retrieving a first set of search results for the search image from the image corpus;
prior to determining the search query performance, selecting a subset of images from the first set of search results based on a ranking of the first set of search results; and
determining a post-retrieval image similarity based on a comparison between the subset of images and the search image, wherein the search query performance of the search image is determined further based on the post-retrieval image similarity.

4. The media of claim 1, further comprising:
identifying a second image that exceeds the search query performance of the search image; and
providing for display at the search engine, the second image as another recommendation for the search query, the first image and the second image being presented as selectable options.

5. The media of claim 4, wherein the search image comprises a first aspect and a second aspect, and wherein the first image comprises the first aspect and the second image comprises the second aspect.

6. The media of claim 5, wherein each image of the set of the search result images includes the first aspect associated with the first image.

7. The media of claim 1, further comprising training the image quality indication model to output the image quality indication based on a training dataset comprising labeled images, the labeled images being labeled based on one or more of angle of view, blurriness, and background quality.

8. The media of claim 1, wherein the trained image quality indication model is a convolutional neural network.

9. A computer implemented method for a visual search recommendation, the method comprising:
training an image quality indication model to output image quality indications of input images based on one or more of an angle of view, blurriness, and background quality;
generating an image similarity determination model, wherein the image similarity determination model determines an image similarity between a search image and images of an image corpus based on image latent vectors;
generating an output engine configured to output a recommended image for recommendation as a search query, the recommended image based on identifying an image exceeding a search query performance for a search image determined based on an image quality indication of the recommended image determined using the trained image quality indication model and the image similarity determined using the image similarity determination model;
in response to receiving a first search image as a first search query, providing a first recommended image, via the output engine, for the recommendation as the first search query based on the first recommended image exceeding the search query performance determined based on providing the first search image to the trained image quality indication model and the image similarity determination model;
receiving an indication to use the first recommended image;
providing a set of the search result images in response to receiving the indication to use the first recommended image, each of the set of the search result images exceeding the search query performance for the first search query; and
receiving a selection of one of the set of search result images.

10. The method of claim 9, the output engine further configured to output the recommended image based on the image similarity of the recommended image having a maximum image similarity compared to image similarities.

11. The method of claim 10, wherein the image similarity determination model comprises a convolutional neural network, the convolutional neural network trained to determine the image similarity.

12. The method of claim 9, wherein the image quality indication model is trained to output the image quality indications of the input images based on a resolution.

13. The method of claim 12, wherein the image quality indication model is trained additionally based on an item size, or an image size.

14. The method of claim 9, wherein the image similarity determination model determines the image similarity based on intensity patterns within the images, and wherein the images are selected for determining the image similarity based on each of the images being with a same category.

15. A system for a visual search recommendation, the system comprising:
at least one processor; and
one or more computer storage media storing computer-readable instructions that when executed by the at least one processor, cause the at least one processor to perform operations comprising:
providing a search image at a search engine;
receiving a recommended image as a selectable option from the search engine based on the search image, wherein the recommended image is determined based on the recommended image having a search query performance exceeding a search query performance of the search image, the search query performance of the recommended image and the search query performance of the search image determined from an image quality indication determined by a trained image quality indication model and an image similarity determined by a trained image similarity determination model;
selecting the recommended image for use as a search query at the search engine;
receiving from the search engine a search results page comprising search result images corresponding to the recommended image selected the search result images exceeding the search query performance of the search image, the search result images being presented as selectable options; and
selecting one of the selectable options.

16. The system of claim 15, wherein the trained image quality indication model is a convolutional neural network.

17. The system of claim 15, further comprising:
receiving a set of search results identified for the search image, the set of search results including rankings for of each of the set of search results, the rankings based on embeddings of each of the set of search results, the embeddings corresponding to a category;

selecting a subset of images from the set of search results based on the rankings; and receiving the recommended image for use as the search query based on the subset of images selected.

18. The system of claim 17, wherein the recommended image is recommended based on a post-retrieval image quality indication determined by the trained image quality indication model, the trained image quality indication model using an item size, an image size, or background quality.

19. The system of claim 15, wherein the trained image quality indication model is trained to output the image quality indication based on a resolution and a category of the search image.

* * * * *